United States Patent
Shirakawa

(10) Patent No.: US 9,853,736 B2
(45) Date of Patent: Dec. 26, 2017

(54) OPTICAL TRANSMITTER AND BIAS CONTROL METHOD FOR OPTICAL MODULATOR

(71) Applicant: Fujitsu Optical Components Limited, Kawasaki-shi, Kanagawa (JP)

(72) Inventor: Iori Shirakawa, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/934,263

(22) Filed: Nov. 6, 2015

(65) Prior Publication Data
US 2016/0156416 A1 Jun. 2, 2016

(30) Foreign Application Priority Data
Nov. 27, 2014 (JP) .................. 2014-240441

(51) Int. Cl.
*H04B 10/50* (2013.01)
*H04B 10/516* (2013.01)
(Continued)

(52) U.S. Cl.
CPC ..... *H04B 10/5161* (2013.01); *H04B 10/0799* (2013.01); *H04B 10/40* (2013.01);
(Continued)

(58) Field of Classification Search
CPC .............. H04B 10/505; H04B 10/5053; H04B 10/5057–10/50577
See application file for complete search history.

(56) References Cited

U.S. PATENT DOCUMENTS 6,278,539 B1 8/2001 Ooi et al.
2001/0007508 A1 7/2001 Ooi et al.
(Continued)

FOREIGN PATENT DOCUMENTS

CN 1254851 5/2000
CN 101154994 4/2008
(Continued)

OTHER PUBLICATIONS

J-PlatPat Abstract, Publication No. 2013-088702, Published May 13, 2013.
(Continued)

*Primary Examiner* — Nathan Curs
(74) *Attorney, Agent, or Firm* — Staas & Halsey LLP

(57) ABSTRACT

An optical transmitter has an optical modulator having Mach-Zehnder interferometers, modulator drivers configured to drive the optical modulator by a drive signal, a low frequency generator configured to generated a low frequency signal that changes a ratio of a driving amplitude with respect to a half-wave voltage of the optical modulator, a photodetector configured to detect a portion of output light of the optical modulator, a detector configured to detect a low frequency component contained in a detected signal from the photodetector using the low frequency signal, and a bias voltage controller configured to control a bias voltage for the optical modulator such that the detected low frequency component becomes the maximum and in-phase with the superimposed low frequency signal.

9 Claims, 22 Drawing Sheets

(51) Int. Cl.
   *H04B 10/079* (2013.01)
   *H04B 10/40* (2013.01)
   *H04B 10/564* (2013.01)
(52) U.S. Cl.
   CPC ... *H04B 10/5053* (2013.01); *H04B 10/50572* (2013.01); *H04B 10/50575* (2013.01); *H04B 10/564* (2013.01)

(56) References Cited

U.S. PATENT DOCUMENTS

| | | | |
|---|---|---|---|
| 2002/0171899 A1* | 11/2002 | Gurusami | H04B 10/6931 398/141 |
| 2003/0210914 A1* | 11/2003 | Khayim | H04B 10/50575 398/197 |
| 2008/0080872 A1 | 4/2008 | Tanaka et al. | |
| 2010/0080571 A1* | 4/2010 | Akiyama | G02F 1/0123 398/184 |
| 2012/0155880 A1 | 6/2012 | Nishimoto et al. | |
| 2014/0334829 A1 | 11/2014 | Akiyama | |

FOREIGN PATENT DOCUMENTS

| | | |
|---|---|---|
| EP | 1975693 | 10/2008 |
| EP | 2530855 | 12/2012 |
| JP | 2013-88702 | 5/2013 |
| WO | WO 2013/114628 A1 | 8/2013 |

OTHER PUBLICATIONS

H. Kawakami et al., "Auto bias control technique for optical 16-QAM transmitter with asymmetric bias dithering," *Optics Express*, vol. 19, No. 26, Dec. 12, 2011, pp. B308-B312.

Extended European Search Report dated Apr. 1, 2016 for European Patent Application No. 15193838.8.

Chinese Office Action dated Aug. 29, 2017 for corresponding Chinese Patent Application No. 201510844171.7**.

* cited by examiner

FIG.1
(A) EYE DIAGRAM FOR QPSK SIGNAL
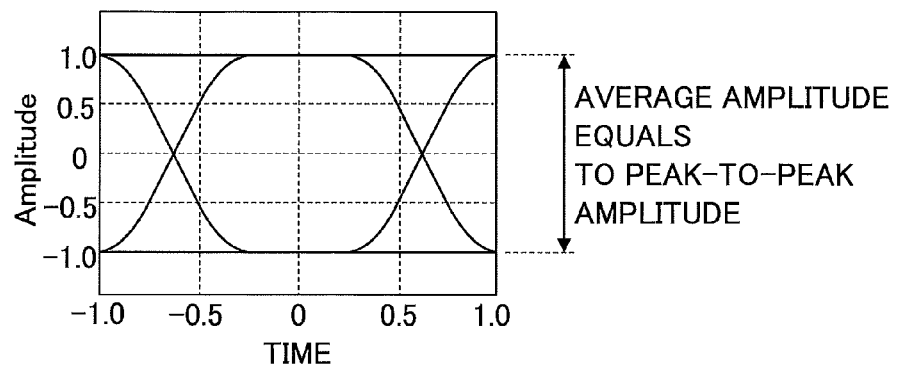
AVERAGE AMPLITUDE EQUALS TO PEAK-TO-PEAK AMPLITUDE
(B) EYE DIAGRAM FOR Nyquist-QPSK SIGNAL
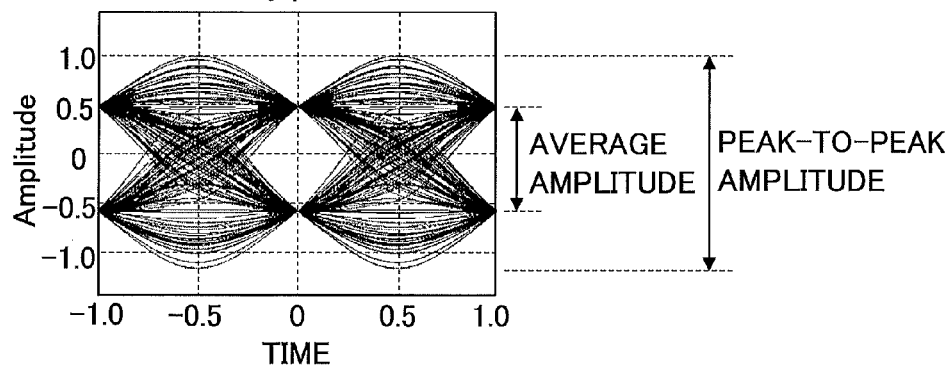
AVERAGE AMPLITUDE | PEAK-TO-PEAK AMPLITUDE
(C) EYE DIAGRAM FOR 16-QAM SIGNAL
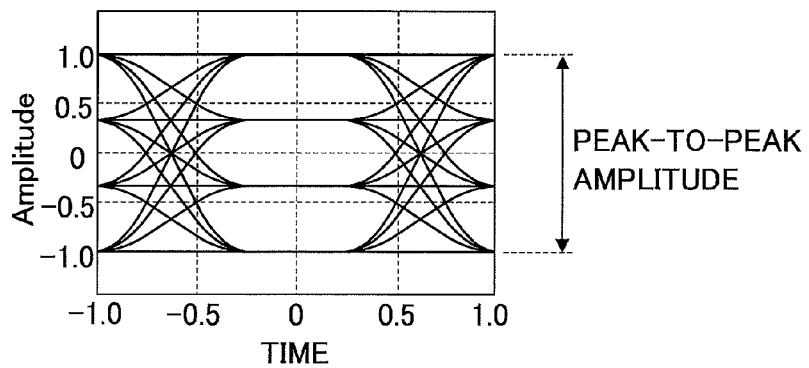
PEAK-TO-PEAK AMPLITUDE

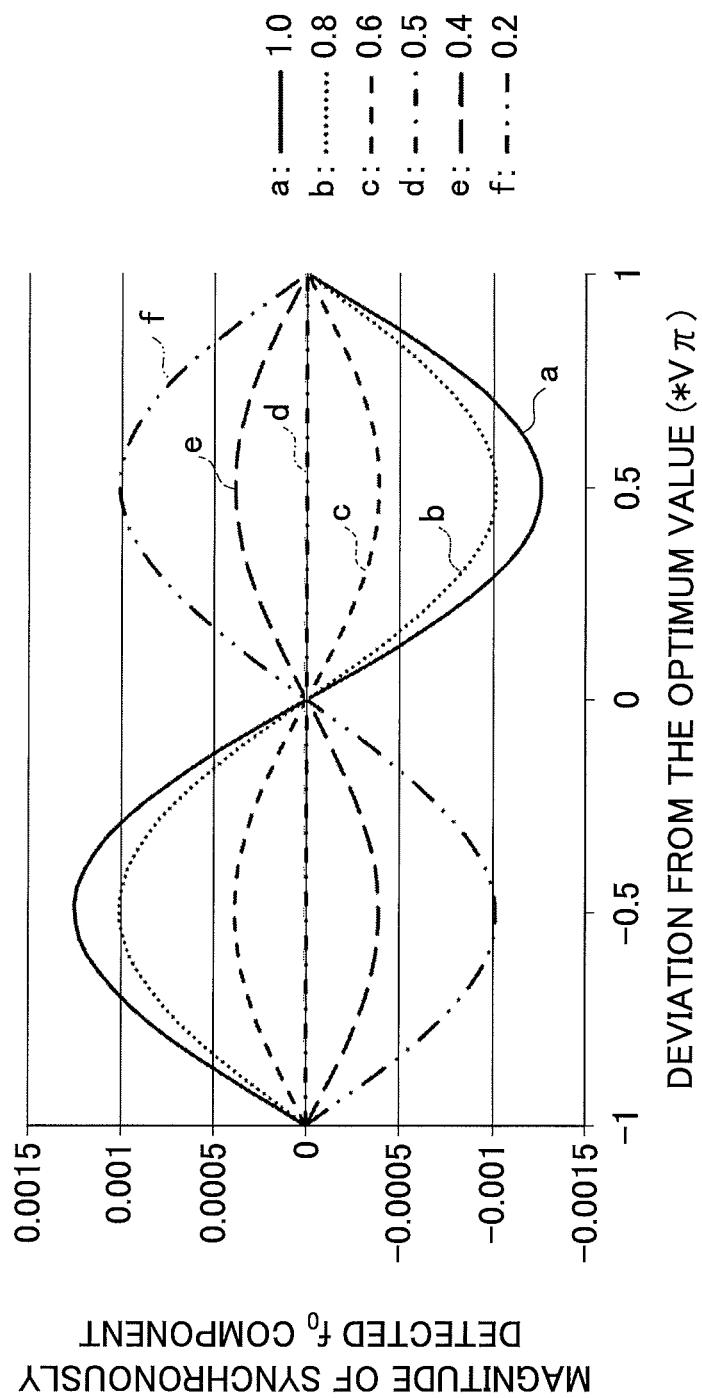

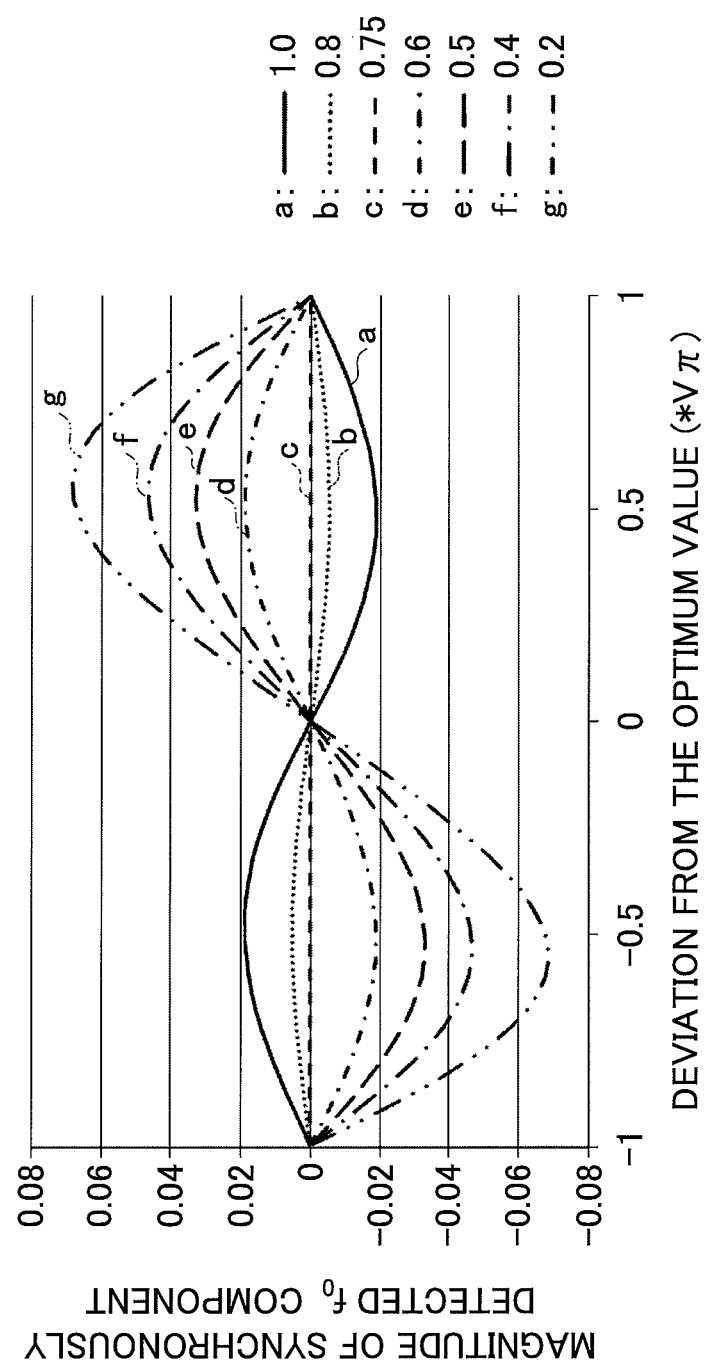

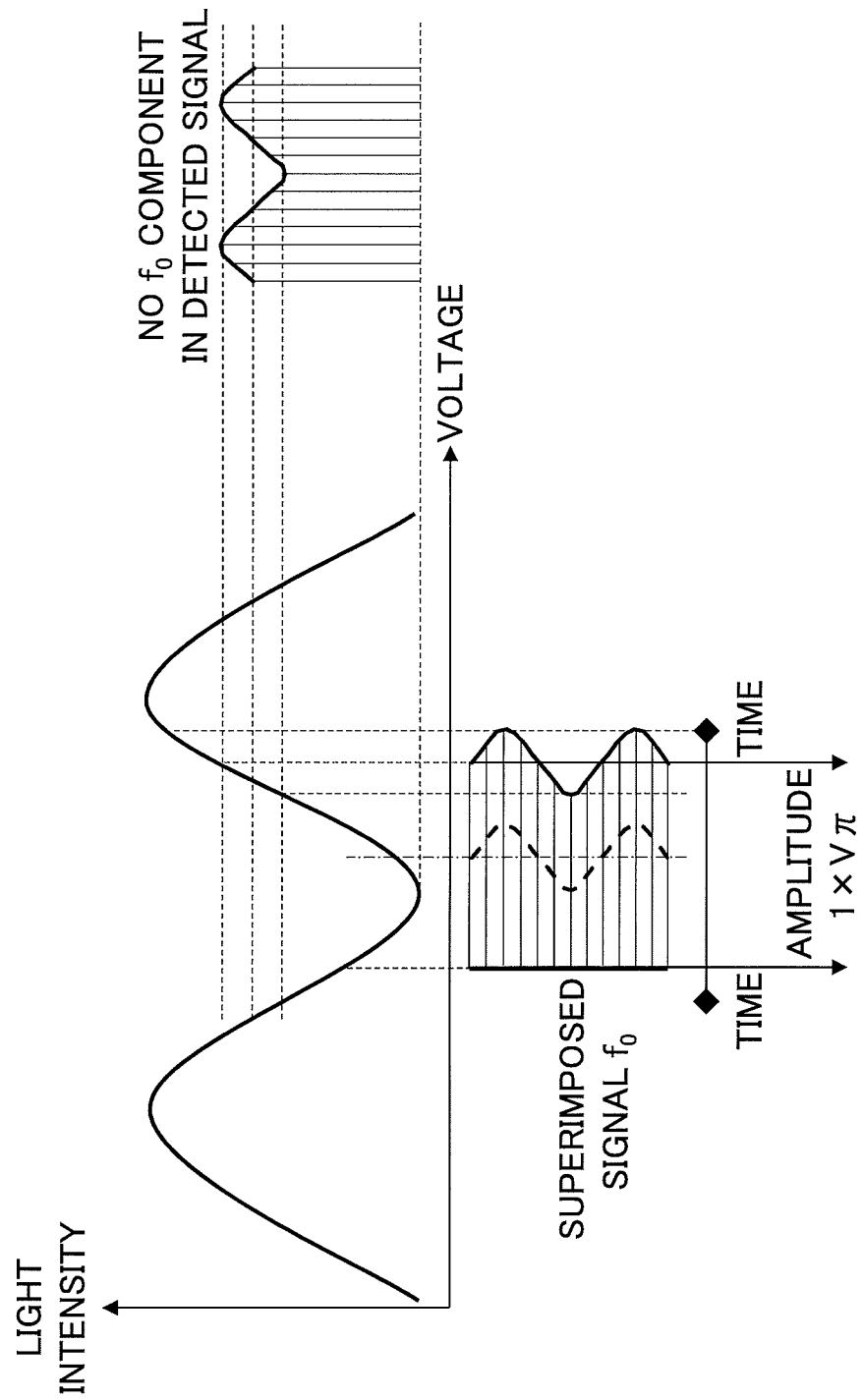

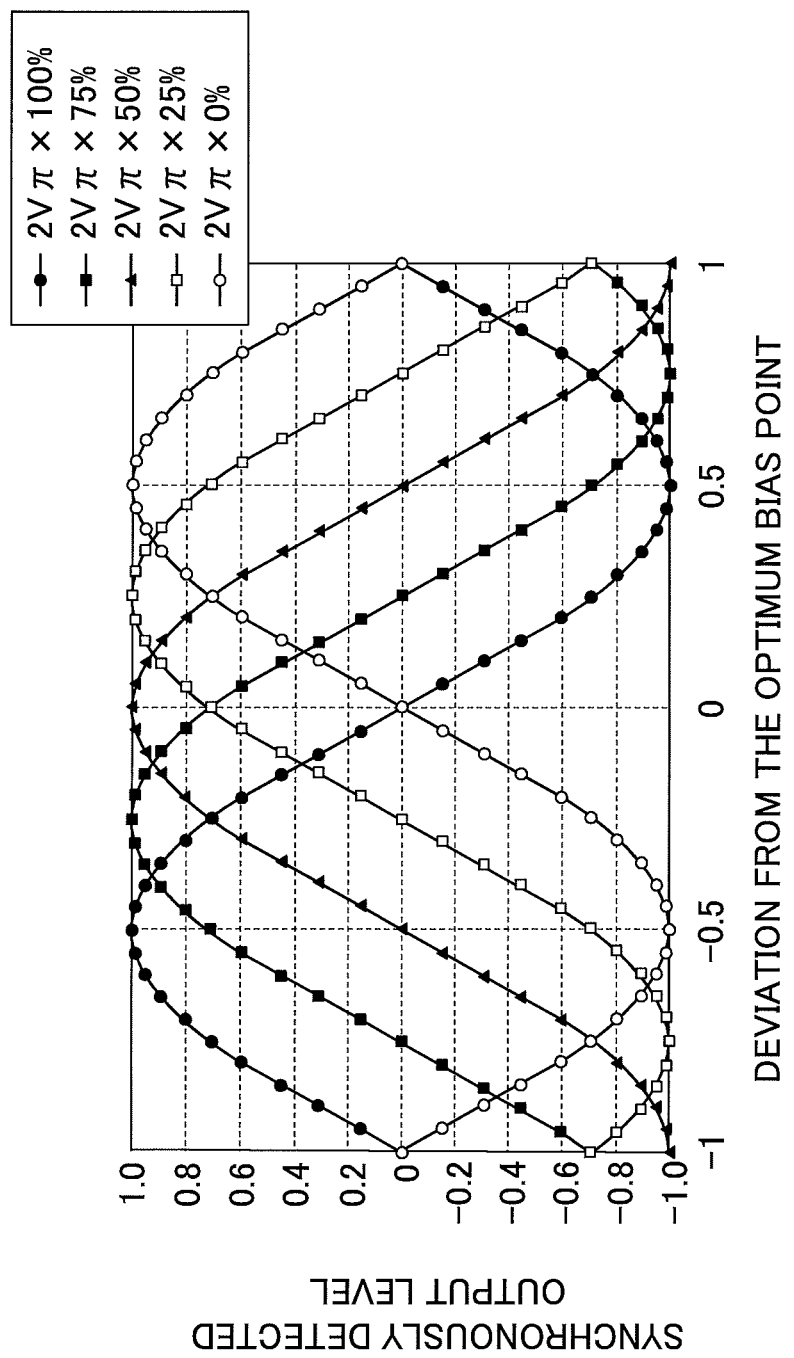

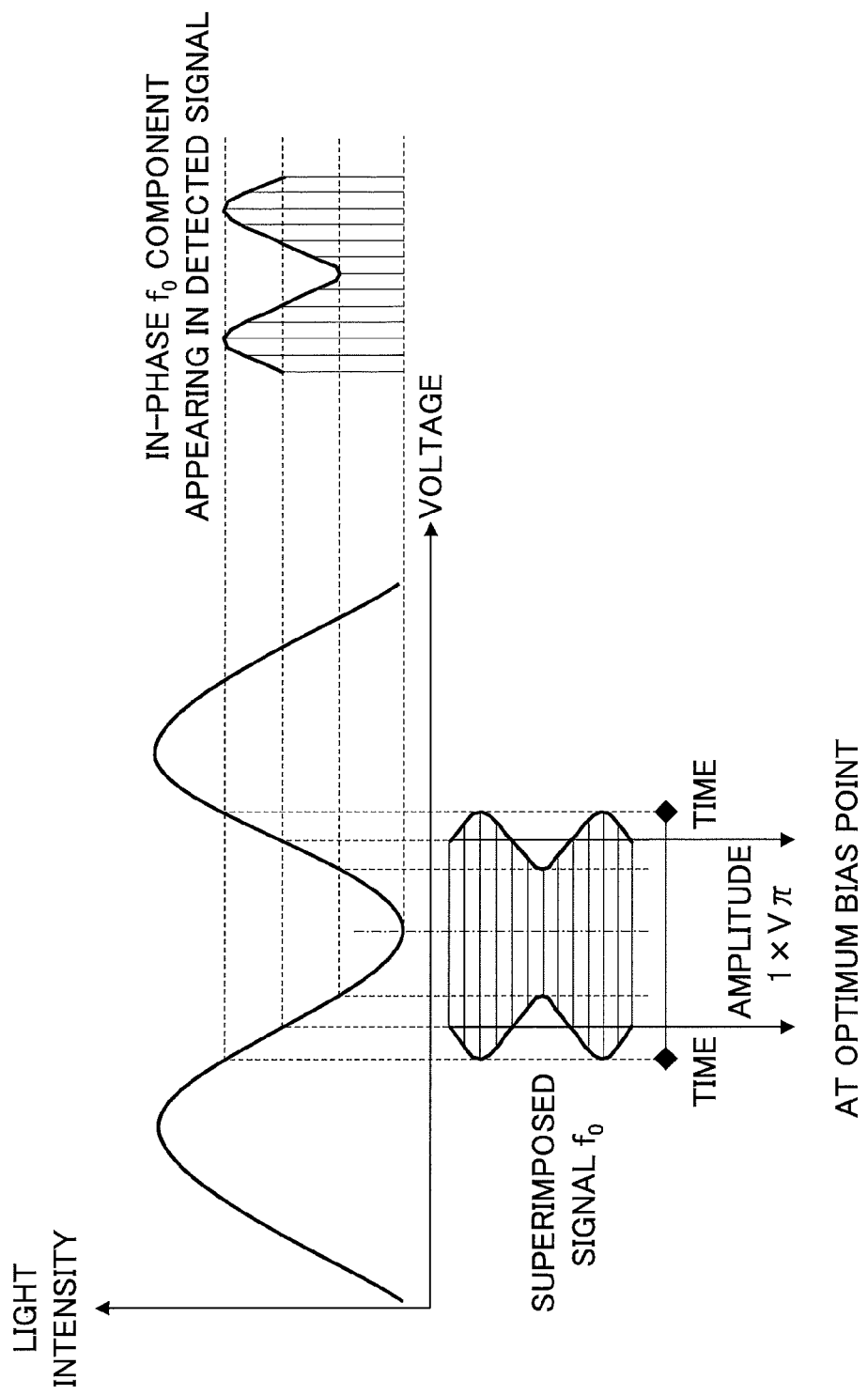

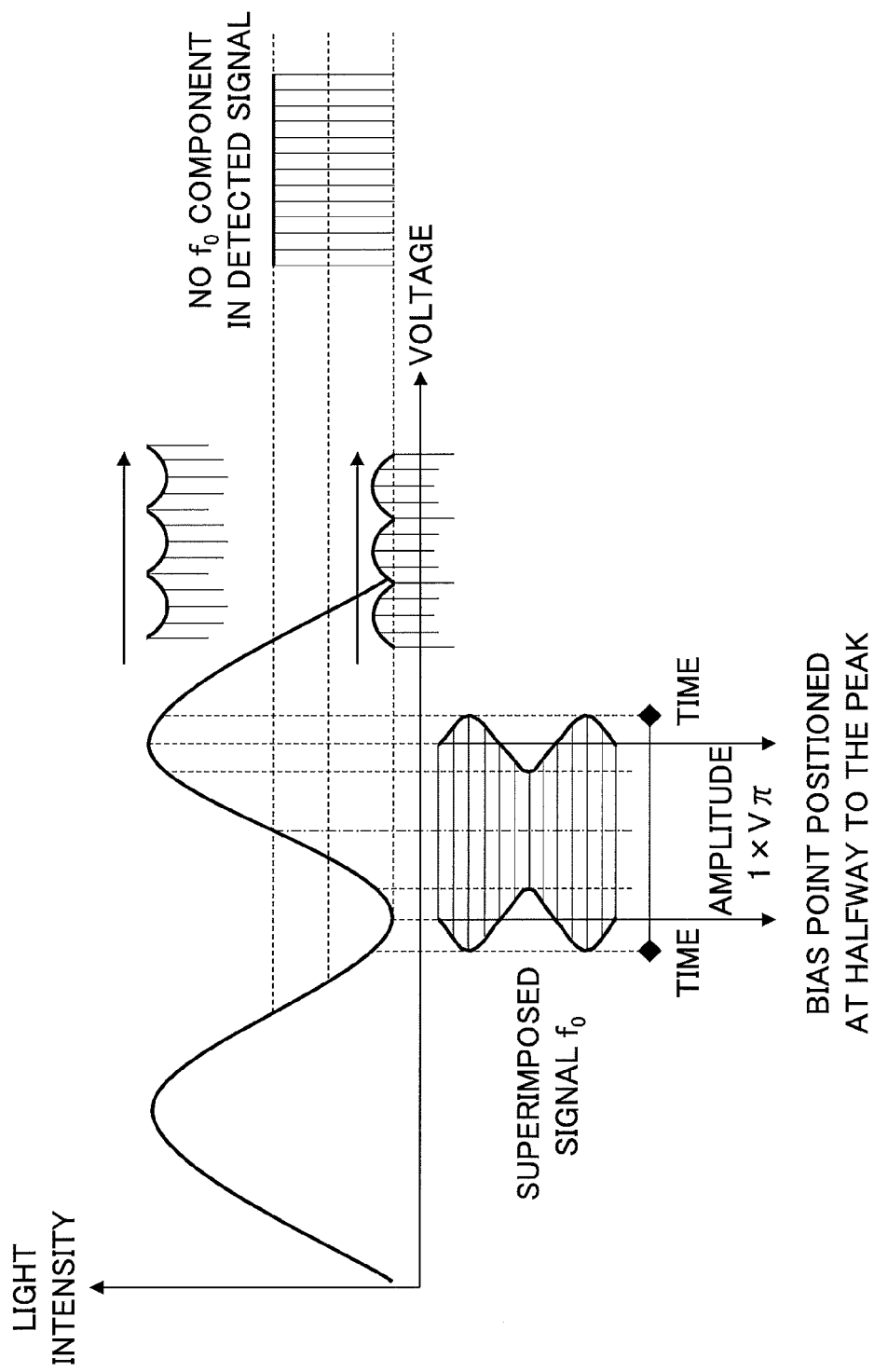

OPTICAL TRANSMITTER AND BIAS CONTROL METHOD FOR OPTICAL MODULATOR

CROSS-REFERENCE TO RELATED APPLICATIONS

This application is based upon and claims the benefit of priority of Japanese Patent Application No. 2014-240441 filed on Nov. 27, 2014, which is incorporated herein by references in its entirety.

FIELD

The disclosures herein relate to an optical transmitter and a bias control method for optical modulators.

BACKGROUND

In recent years, 100 Gigabit-per-second (Gbps) long-distance optical transmission has been implemented by dual-polarization quadrature phase-shift keying (DP-QPSK) using a digital coherent technology. To further improve transmission capacity, narrower spectrum bandwidth and higher-level modulation schemes are desired.

In high-speed optical transmission over 10 Gbps, Mach-Zehnder (MZ) modulators are typically used as optical modulators. To generate high-quality optical signals, the operating point of an optical modulator is maintained in the appropriate point with respect to the input drive signals. In phase modulation schemes, a bias voltage applied to the optical modulator is controlled such that the center of the oscillation of an electrical data signal comes to be consistent with the minimum point of the driving voltage to light intensity characteristic curve of the MZ modulator. In order to control the bias voltage to the appropriate value, a low frequency signal is superimposed on the bias voltage, and feedback control is performed on the bias voltage so as to minimize a low frequency ($f_0$) component contained in the output light.

FIG. 1 illustrates eye diagrams of driving signals. Diagram (A) is a drive waveform for QPSK modulation. Diagram (B) is a narrow-band drive waveform for Nyquist-QPSK modulation. Diagram (c) is a multilevel drive waveform for 16 quadrature amplitude modulation (16-QAM). The voltage that causes a change in the light output of a MZ modulator from the maximum light intensity to the minimum light intensity is generally called a half-wave voltage $V\pi$. By using a drive signal with amplitude $2 \times V\pi$, the maximum output level of a light signal can be obtained. Accordingly, for QPSK modulation, a drive signal having amplitude $2 \times V\pi$ is typically used as in the diagram (A).

In contrast, in narrowband transmission in diagram (B) or higher-level modulation schemes in diagram (C), the peak-to-peak driving amplitude becomes greater than the average amplitude of the drive signal. In this case, the average amplitude of the drive signal is set to a value less than $2 \times V\pi$. However, when reducing the amplitude of the drive signal, there is a certain driving amplitude existing that makes the conventional bias control scheme unable to perform bias control.

FIG. 2A and FIG. 2B are diagrams to explain the problem arising when performing bias control using a drive signal with reduced amplitude in Nyquist-QPSK modulation. FIG. 2A illustrates a voltage to light intensity characteristic observed when using a drive signal with average amplitude of $1 \times V\pi$ on which a low frequency signal is superimposed. In general, the light output characteristic drifts with respect to the drive signal due to change in temperature or change with time. In the example of FIG. 2A, the operating point deviates or drifts from the optimum bias point (at which the center of the oscillation of the drive signal is coincident with the minimum point of the light intensity characteristic). In this state, when the bias voltage swings to the higher side due to the superimposed low frequency signal $f_0$, the output level of light on the higher-voltage side at the operating point increases (from the trough toward the peak), but the output level of light on the lower-voltage side at the operating point decreases (toward the trough). These changes in the light output level are cancelled out each other. As a result, the low frequency $f_0$ component cannot be detected even if the bias point drifts from the optimum point.

FIG. 2B is a chart illustrating magnitude of the synchronously detected low frequency $f_0$ component as a function of bias voltage for various parameters of the amplitude of the drive signal. From the sinusoidal waveforms "a" through "f", as the amplitude of the modulator drive signal decreases from $1 \times 2V\pi$ to $0.8 \times 2V\pi$, $0.2 \times 2V\pi$, the magnitude of the detected low frequency $f_0$ component becomes smaller. The sensitivity becomes zero at 50% amplitude (i.e., $1 \times V\pi$). When the amplitude becomes less than 50%, the sign or the polarity is inverted and the detection sensitivity gradually increases. When the detected low frequency component is in-phase with respect to the superimposed low frequency signal, the sign is positive. When the detected low frequency component is 180-degree out-of-phase with respect to the superimposed low frequency, the sign is negative.

FIG. 3 illustrates magnitude of the synchronously detected low frequency $f_0$ component as a function of bias voltage for various parameters in 16-QAM modulation. Similarly to the conventional QPSK bias control, a low frequency signal $f_0$ is superimposed on the bias voltage to perform feedback control so as to bring the synchronously detected $f_0$ component closer to zero during 16-QAM modulation. see, for example, Hiroto Kawakami, "Auto bias control technique for optical 16-QAM transmitter with asymmetric bias dithering", OPTICS EXPRESS, Vol. 19, No. 26, pp. B308-B312, December, 2011. As illustrated in FIG. 3, depending on the amplitude of the drive signal, no low frequency component is detected in spite of the fact that drift of the bias point is observed. In the example of FIG. 3, at the driving amplitude of $0.75 \times 2V\pi$, a low frequency component cannot be detected even if the operating point has deviated from the optimum bias point. Besides, depending on the amplitude of the drive signal, the relationship between the in-phase and the 180-degree out-of-phase indicating the direction of the drift of the bias point is reversed.

FIG. 4A and FIG. 4B illustrate a known technique for solving the problem of the presence of a driving amplitude that precludes bias control. In FIG. 4A, an asymmetric combined signal is produced by superimposing a dither signal on the bias voltage, as well as on the modulator drive signal. See, for example, Japanese Patent Laid-open Publication No. 2013-88702. Using the combined signal, the light intensity changes only on the higher voltage side, and a low frequency component can be detected upon occurrence of the drift of the bias point even if the amplitude of the drive signal is $1 \times V\pi$, as illustrated in FIG. 4B. Consequently, as illustrated in FIG. 5, a low frequency component is detected without fail upon occurrence of the drift of the bias point from the optimum point regardless of the designed amplitude of the drive signal.

Another known technique is to superimpose the first pilot signal on the drive signal, while superimposing the second pilot signal on the bias voltage for an optical, to generate a high-quality optical signal even if the amplitude of the drive signal changes. Based upon the first pilot signal component and the second pilot signal component detected from the output light, the bias voltage applied to the optical modulator is controlled. See, for example, PCT Patent Publication WO 2013/114628.

However, with the conventional technique illustrated in FIG. 4A, FIG. 4B and FIG. 5, the target value of the low frequency component used as a criterion for bias control has to be changed according to the driving amplitude. For example, with a driving amplitude of $2 \times V\pi$, the bias voltage is controlled such that the low frequency component contained in the output light becomes zero (see, the sinusoidal curve of dark circle marks in FIG. 5). with a driving amplitude of $1 \times V\pi$ ($2*V\pi \times 50\%$), the bias voltage is controlled such that the low frequency component contained in the output light becomes the maximum (see, the sinusoidal curve of dark triangle marks in FIG. 5). With a driving amplitude of 75%, the bias voltage is controlled such that the low frequency component contained in the output light becomes about 70% of the maximum magnitude (see, the sinusoidal curve of dark square marks in FIG. 5).

With this conventional method, the driving amplitude is always monitored to change the target value of the low frequency component contained in the output light depending on the driving amplitude, and the control operations become complicated and difficult. Taking into account the change with age in the characteristics of the circuit components or temperature change, it is unrealistic to control the bias voltage such that the magnitude of the detected low frequency component becomes a specific value. In 16-QAM, there is a condition where no $f_0$ component is detected in spite of the drift of the bias point depending on the driving amplitude (see, FIG. 3). There is still another problem that the control direction of the bias voltage is switched depending on the driving amplitude.

For these reasons, it is desired to provide a technique for controlling the bias voltage of an optical modulator to the optimum bias point in a stable manner regardless of the employed amplitude of the modulator drive signal.

SUMMARY

According to an aspect of the disclosures, an optical transmitter has an optical modulator having Mach-Zehnder interferometers, modulator drivers configured to drive the optical modulator by drive signals, a low frequency generator configured to generated a low frequency signal that changes a ratio of a driving amplitude with respect to a half-wave voltage of the optical modulator, a photodetector configured to detect a portion of output light of the optical modulator, a detector configured to detect a low frequency component contained in a detected signal from the photodetector using the low frequency signal, and a bias voltage controller configured to control a bias voltage for the optical modulator such that the detected low frequency component becomes the maximum and in-phase with the superimposed low frequency signal.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 1 illustrates signal waveforms according to modulation schemes;

FIG. 2B illustrates a case in which bias control does not work depending on the driving amplitude;

FIG. 3 illustrates a case in which bias control does not work depending on the driving amplitude in 16-QAM.

FIG. 4A and FIG. 4B illustrate a known technique for eliminating a driving amplitude that precludes bias control;

FIG. 5 illustrates a relation between the deviation from the optimum bias point and synchronously detected output level according to the technique of FIG. 4A and FIG. 4B;

FIG. 8 is a diagram to explain behaviors of bias control according to the embodiment;

FIG. 9 is a diagram to explain behaviors of bias control according to the embodiment;

DESCRIPTION OF EMBODIMENTS

The embodiments of the invention are now described referring to the attached figures.

Figure 2A:
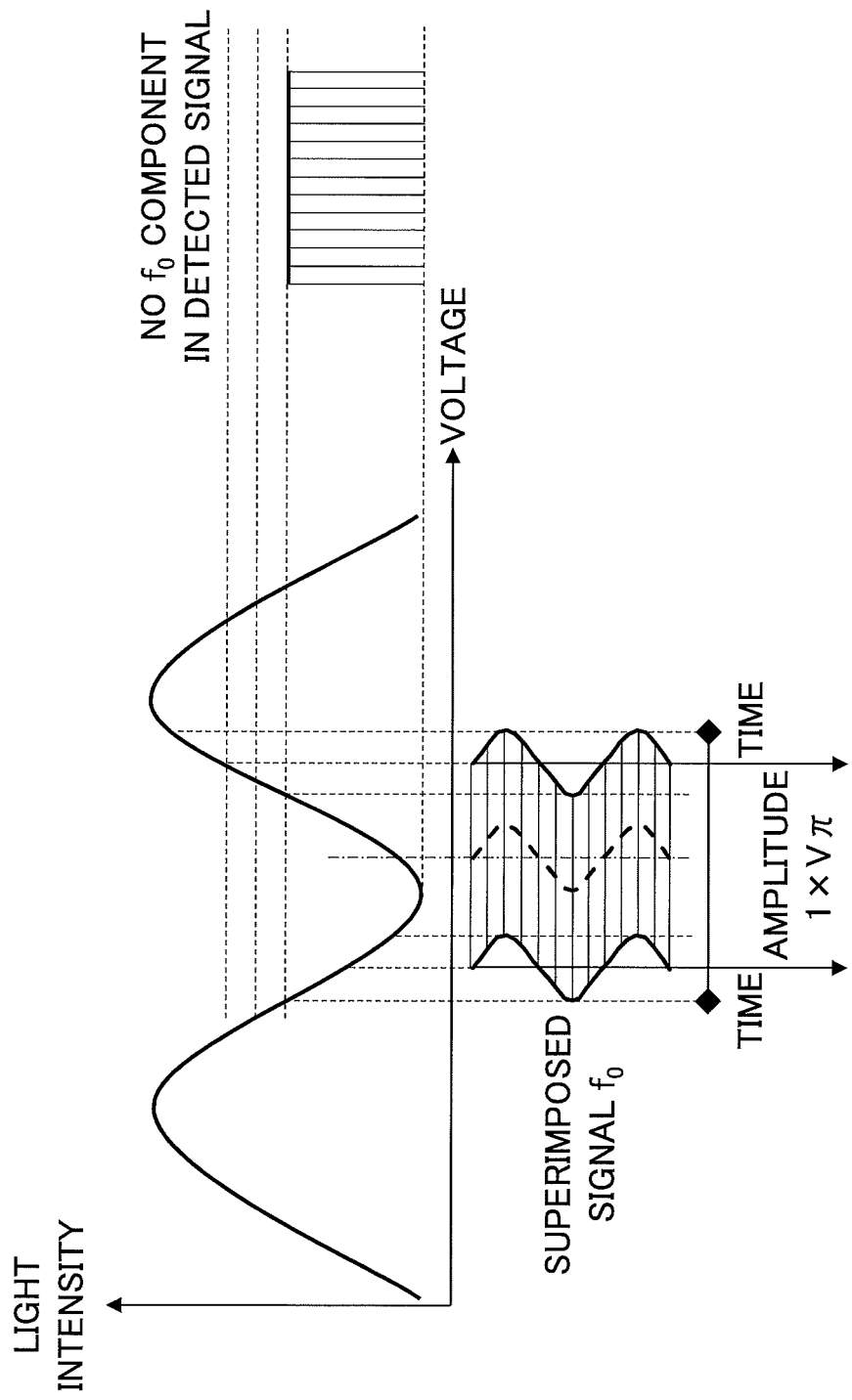
FIG. 2A illustrates a case in which bias control does not work.
Figure 4A:
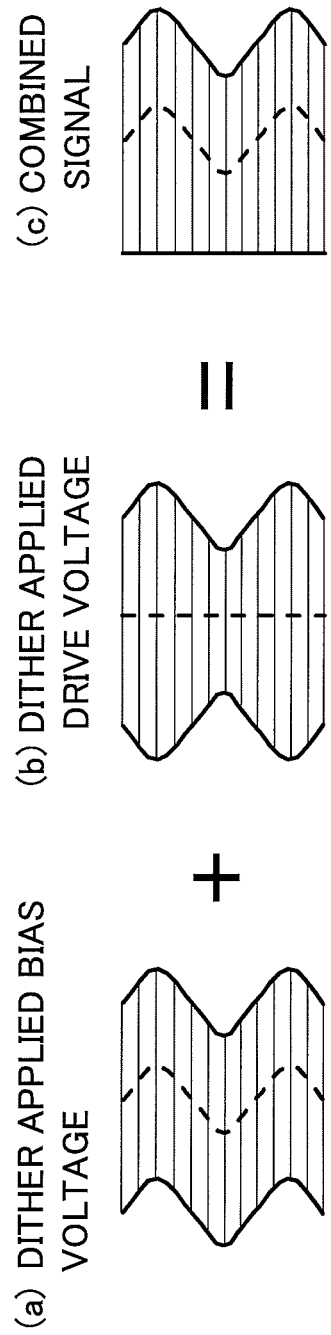
Figure 6:
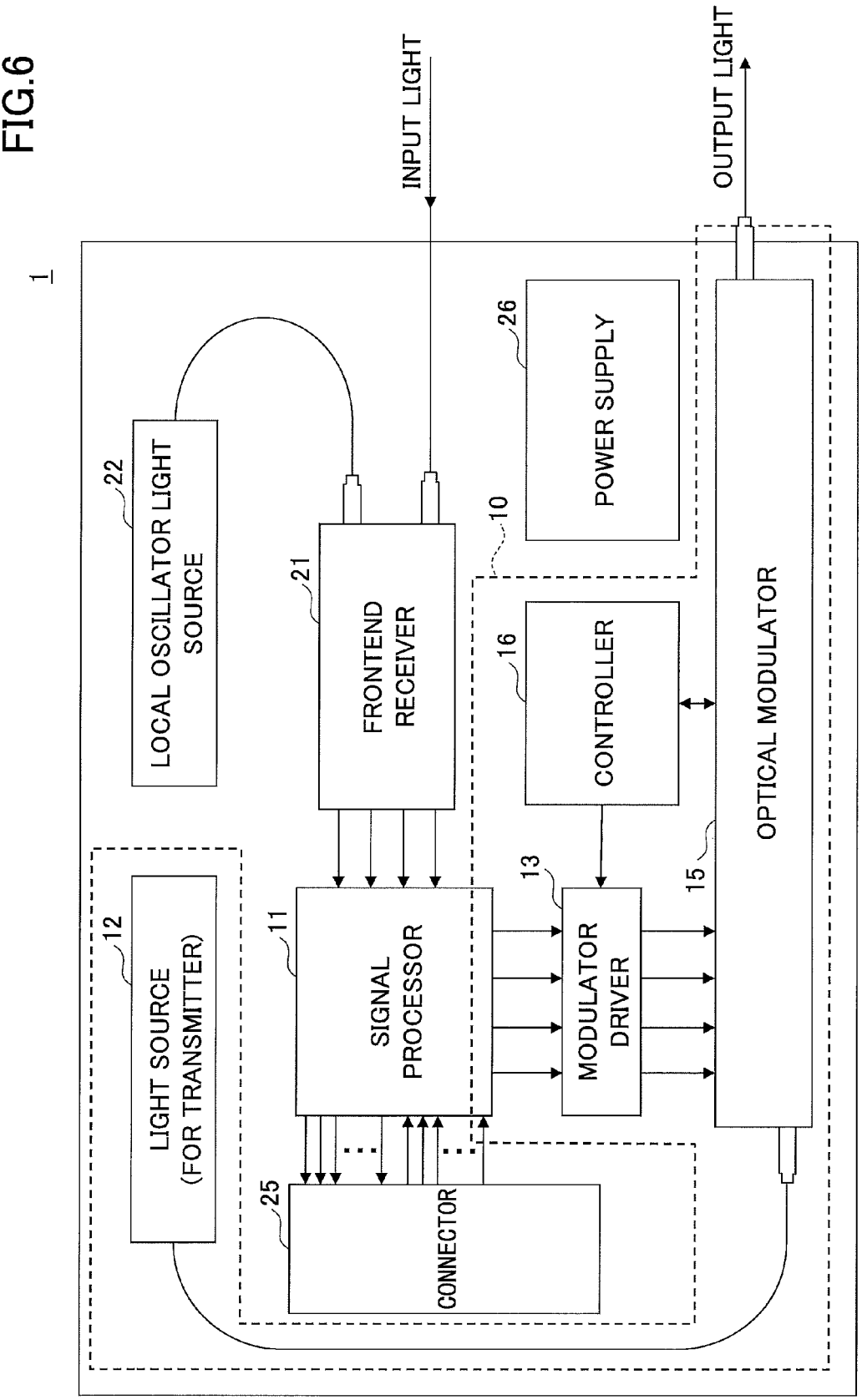
FIG. 6 is a schematic diagram of an optical transceiver to which the present invention is applied.

FIG. 6 is a schematic diagram of an optical transceiver 1 for use in fiber optic transmission, to which the control scheme of the embodiments is applied. The optical transceiver 1 includes a connector 25 for externally inputting and outputting electric signals, a power supply 26, and a signal processor 11. The signal processor 11 performs, for example, multiplexing electric signals or processing the signals into suitable forms for optical transmission and reception. The optical transceiver 1 also has an optical transmitter 10, a frontend receiver 21, and a local oscillator light source 22. The frontend receiver 21 receives an optical signal from the external and detects the signal by converting interference light with local oscillator light into an electric signal.

The optical transmitter 10 has a light source 12 for transmitter, an optical modulator 15, modulator drivers 13a and 13b for driving the optical modulator 15, and a controller 16 for controlling the operations of the optical modulator 15 and the modulator drivers 13a and 13b. The optical modulator 15 modulates a light beam emitted from the light source 12 with the drive signals supplied from the modulator drivers 13a and 13b, and outputs a modulated light signal. The bias control scheme of the embodiment is used in the optical transmitter 10 of the optical transceiver 1.

Figure 7A:
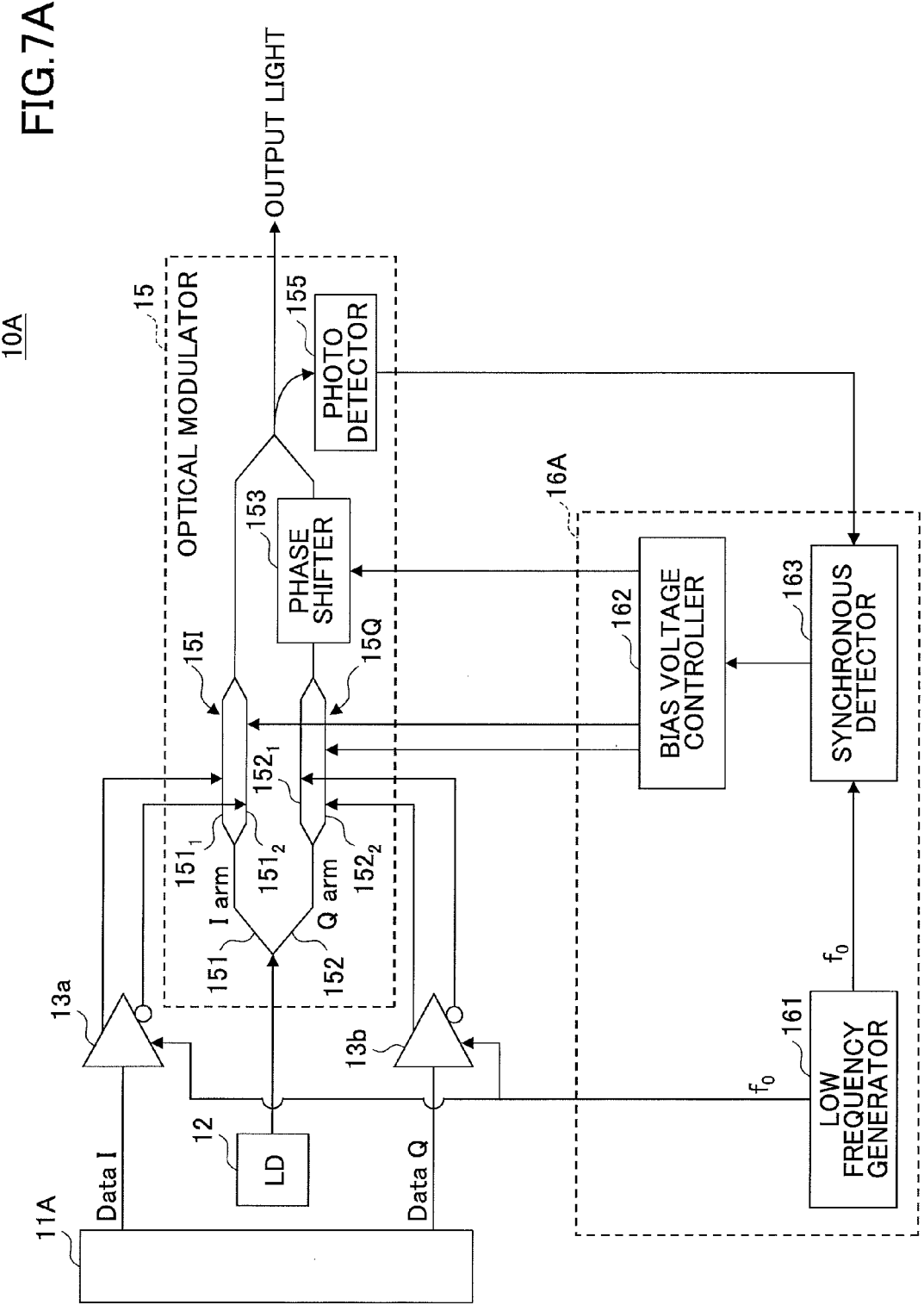
FIG. 7A illustrates an exemplified structure of an optical transmitter.

FIG. 7A is a schematic diagram of a QPSK optical transmitter 10A, which is an example of the optical transmitter 10. Light emitted from the light source 12 such as a laser diode (LD) is input to the optical modulator 15 and split into two waveguides 151 and 152. The optical modulator 15 is, for example, a LiNbO3 Mach-Zehnder modulator. The optical modulator 15 has a first Mach-Zehnder interferometer 15I (which is referred to simply as "first modulator 15I") and a second Mach-Zehnder interferometer 15Q (which is referred to simply as "second modulator 15Q"), and a phase shifter 153 providing a predetermined amount of phase difference between the first modulator 15I and the second modulator 15Q. The first modulator 15I is called an "I-arm" and the second modulator 15Q is called a "Q-arm".

The modulator driver 13a for driving the I-arm of the optical modulator 15 receives a data signal I from the signal processor 11A, and the modulator driver 13b for driving the Q-arm of the optical modulator 15 receives a data signal Q from the signal processor 11A. The light component having been modulated by the data signal I through the I-arm is combined with the light component having been modulated by the data signal Q through the Q-arm with a π/2 phase difference between them, whereby a QPSK modulation signal is produced. A portion of the QPSK modulation signal is detected by the photodetector 155. The detection result is supplied to the controller 16A.

The controller 16A has a low frequency generator 161, a bias voltage controller 162, and a synchronous detector 163. The low frequency generator 161 supplies a low frequency signal $f_0$ to the modulator drivers 13a and 13b. This low frequency signal is superimposed on the data signals and it provides gentle amplitude modulation to the high-frequency data signal (or drive signal). Under the application of the low frequency signal $f_0$, the ratio of the driving amplitude with respect to the half-wave voltage Vπ slightly varies.

The positive output of the modulator driver 13a on which the low frequency signal $f_0$ is superimposed is applied to a waveguide $151_1$ of the I-arm 15I, and the negative output of the modulator driver 13a on which the low frequency signal $f_0$ is superimposed is applied to the other waveguide $151_2$ of the I-arm 15I. Similarly, the $f_0$-superimposed positive output of the modulator driver 13b is applied to a waveguide $152_1$ of the Q-arm 15Q, and the $f_0$-superimposed negative output of the modulator driver 13b is applied to the other waveguide $152_2$ of the Q-arm 15Q.

Figure 7B:
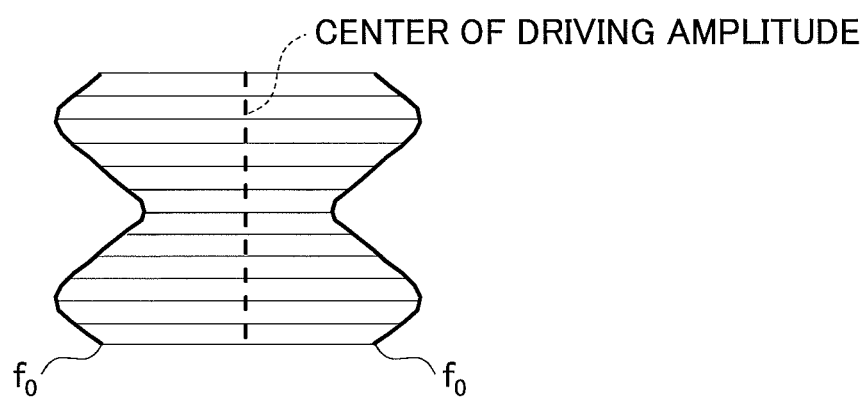
FIG. 7B illustrates a driving waveform used to drive the optical modulator of FIG. 7A.

FIG. 7B illustrates a driving waveform applied to the I-arm 15I and the Q-arm 15Q of the optical modulator 15. The high-frequency drive signal generated by each of the modulator drivers 13a and 13b is subjected to amplitude modulation by the low frequency signal $f_0$. The $f_0$ oscillation appears on one edge of the high-frequency drive signals, and another $f_0$ oscillation with an opposite phase appears on the other edge of the high-frequency drive signals, in the amplitude direction. The optical modulator 15 modulates a transmission light beam with a symmetric driving waveform with respect to the center of driving amplitude.

Returning to FIG. 7A, the synchronous detector 163 carries out synchronous detection using the low frequency signal $f_0$ and detects a low frequency ($f_0$) component from the modulation signal detected by the photodetector 155.

One feature of the optical transmitter 10A is that the bias voltage controller 162 controls the bias voltage applied to the I-arm 15I and the Q-arm such that the low frequency component detected by the synchronous detector 163 becomes in-phase with the superimposed low frequency signal $f_0$ and becomes the maximum, regardless of the ratio of change in driving amplitude of the optical modulator 15. Concerning the control on the phase shifter 153, the bias voltage applied to the phase shifter 153 is controlled such that the light intensity becomes equal between the I-arm 15I and the Q-arm 15Q, and an arbitrary known technique may be employed. Detailed explanation for such a known technique is omitted.

Figure 10:
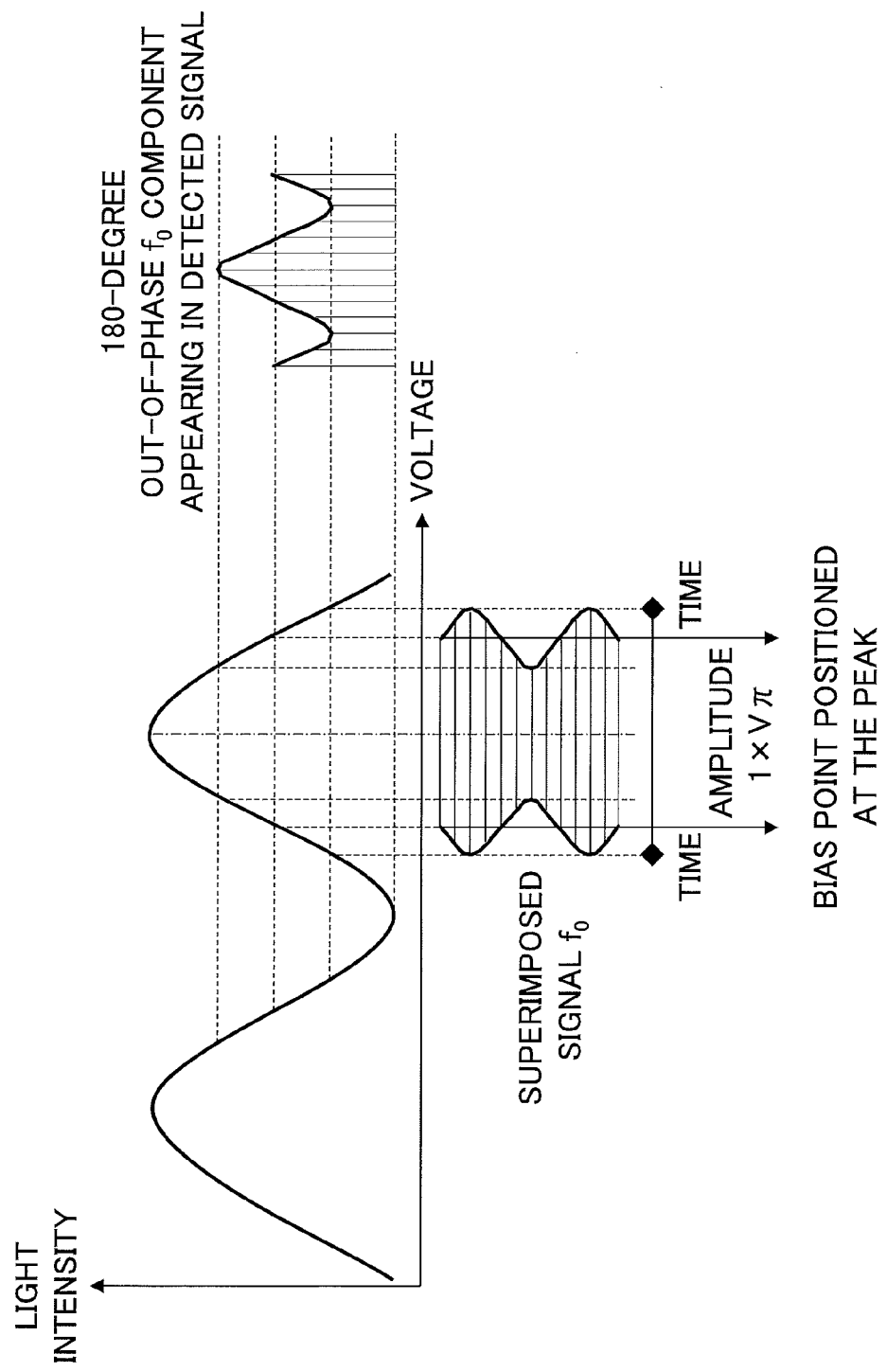
FIG. 10 is a diagram to explain behaviors of bias control according to the embodiment.

FIG. 8 through FIG. 10 are diagram to explain the operations of the optical transmitter 10A. It is assumed that the driving amplitude for driving the optical modulator 15 is set to 1×Vπ. To simplify the explanation, the driving signal is an alternating binary signal with values "0" and "1" arranged alternately. It is also assumed that the monitor system including the photodetector 155 and the synchronous detector 163 operates on a sufficiently wideband range.

FIG. 8 illustrates a case in which the bias voltage is in the optimum state. In this state, the center of the amplitude of the driving waveform is coincident with the minimum point of the driving voltage to light intensity characteristic curve. When the driving amplitude swings in the increasing direction due to the superimposed low frequency signal $f_0$, the operating points of both the high-voltage side and the low-voltage side move in the direction that the light intensity increases (toward the peak). When the driving amplitude swings in the decreasing direction due to the superimposed low frequency signal $f_0$, the operating points of both the high-voltage side and the low-voltage side move in the direction that the light intensity decreases (toward the trough). Consequently, a low frequency ($f_0$) component in-phase with the superimposed $f_0$ signal is synchronously detected.

FIG. 9 illustrates a case in which the bias voltage drifts by 0.5×Vπ. In this state, the center of the amplitude of the driving waveform comes to the point corresponding to halfway to the peak of the driving voltage to light intensity characteristic curve. When the driving amplitude swings or varies due to the superimposed low frequency signal $f_0$, the operating point on the high-voltage side is folded back at the peak of the light intensity and $2×f_0$ component appears on the high-voltage side. On the low-voltage side, the operating point is folded back at the minimum point of the driving voltage to light intensity characteristic curve and $2×f_0$ component with the opposite phase appears on the low-voltage side. These two $2×f_0$ components with optical phases opposite to each other cancel each other, and neither $2×f_0$ component nor $f_0$ component is detected from the output of the optical modulator 15.

FIG. 10 illustrates a case in which the bias voltage drifts by 1.0×Vπ. In this state, when the driving amplitude swings in the increasing direction due to the superimposed low frequency signal $f_0$, the operating points of both the high-voltage side and the low-voltage side move in the direction that the light intensity decreases (toward the trough). When the driving amplitude swings in the decreasing direction due to the superimposed low frequency signal $f_0$, the operating points of both the high-voltage side and the low-voltage side move in the direction that the light intensity increases (toward the peak). Consequently, a low frequency ($f_0$) component 180-degree out-of-phase from the superimposed $f_0$ signal is synchronously detected.

Figure 11:
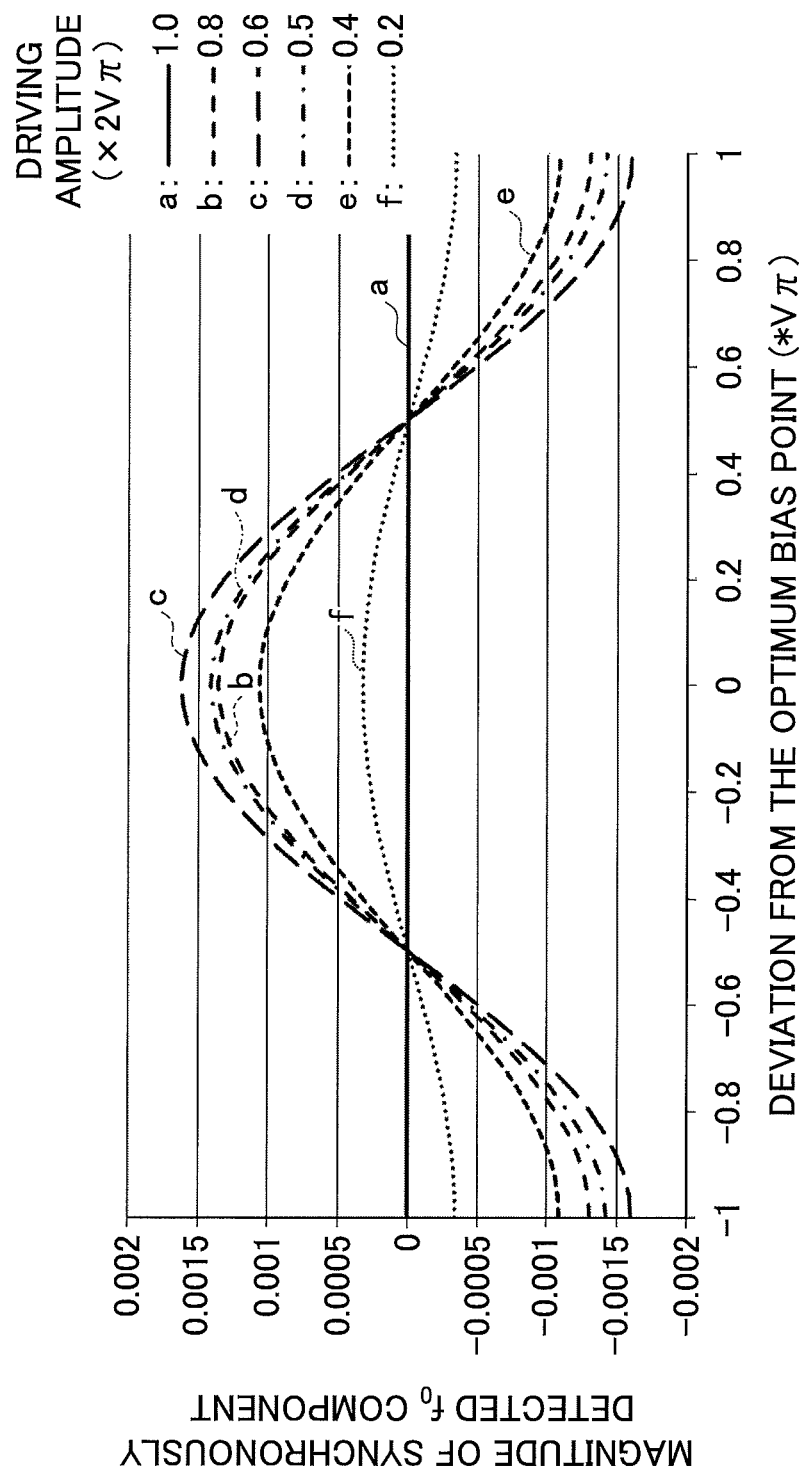
FIG. 11 is a chart illustrating a relation between the deviation from the optimum bias point and magnitude of the synchronously detected low frequency component according to the embodiment.

FIG. 11 is a chart illustrating the simulation result plotting the relation between the deviation of the bias point from the optimum point and magnitude of the detected low frequency component, while changing the driving amplitude among $1 \times 2V\pi$, $0.8 \times 2V\pi$, $0.6 \times 2V\pi$, $0.5 \times 2V\pi$, $0.4 \times 2V\pi$, and $0.2 \times 2V\pi$. The positive range of the vertical axis indicates that the detected low frequency component is in-phase with the low frequency signal $f_0$ superimposed on the drive signal of the optical modulator 15. The negative range of the vertical axis indicates that the detected low frequency component is 180-degree out-of-phase from the low frequency signal $f_0$ superimposed on the drive signal of the optical modulator 15.

Regardless of the value of the driving amplitude employed, the magnitude of the synchronously detected low frequency component becomes always the maximum when the drift of the bias voltage is zero ($0 \times V\pi$). The polarity of the detected low frequency component is positive, that is, in-phase with the superimposed low frequency signal $f_0$. As the drift of the bias voltage increases, the magnitude of the synchronously detected low frequency component decrease, and it becomes zero when the drift of the bias voltage is $\pm 0.5 \times V\pi$. When the drift of the bias voltage further increases, the low frequency component is again detected, but with the opposite polarity. The synchronously detected low frequency component is 180-degree out-of-phase from the low frequency signal $f_0$ superimposed on the drive signal. when the drift of the bias voltage becomes $\pm 1.0 \times V\pi$, the magnitude (the absolute value) of the synchronously detected low frequency component becomes the maximum again.

From FIG. 11, it is understood that even if the driving amplitude changes, the bias point can be set to the optimum point by controlling the bias voltage such that the synchronously detected $f_0$ component is in-phase with the superimposed $f_0$ signal and that the synchronously detected $f_0$ component becomes the maximum. Even if the driving amplitude varies due to change with time or temperature change, the optimum bias voltage can be selected by the control scheme of maximizing the detected $f_0$ component being in-phase with the superimposed $f_0$ signal. This scheme can achieve stable control because the polarity of the $f_0$ component is constant regardless of the driving amplitude (unlike FIG. 3), and because the undesirable situation where no $f_0$ component is detected depending on the driving amplitude in spite of the occurrence of the drift of the bias point can be avoided.

Figure 12:
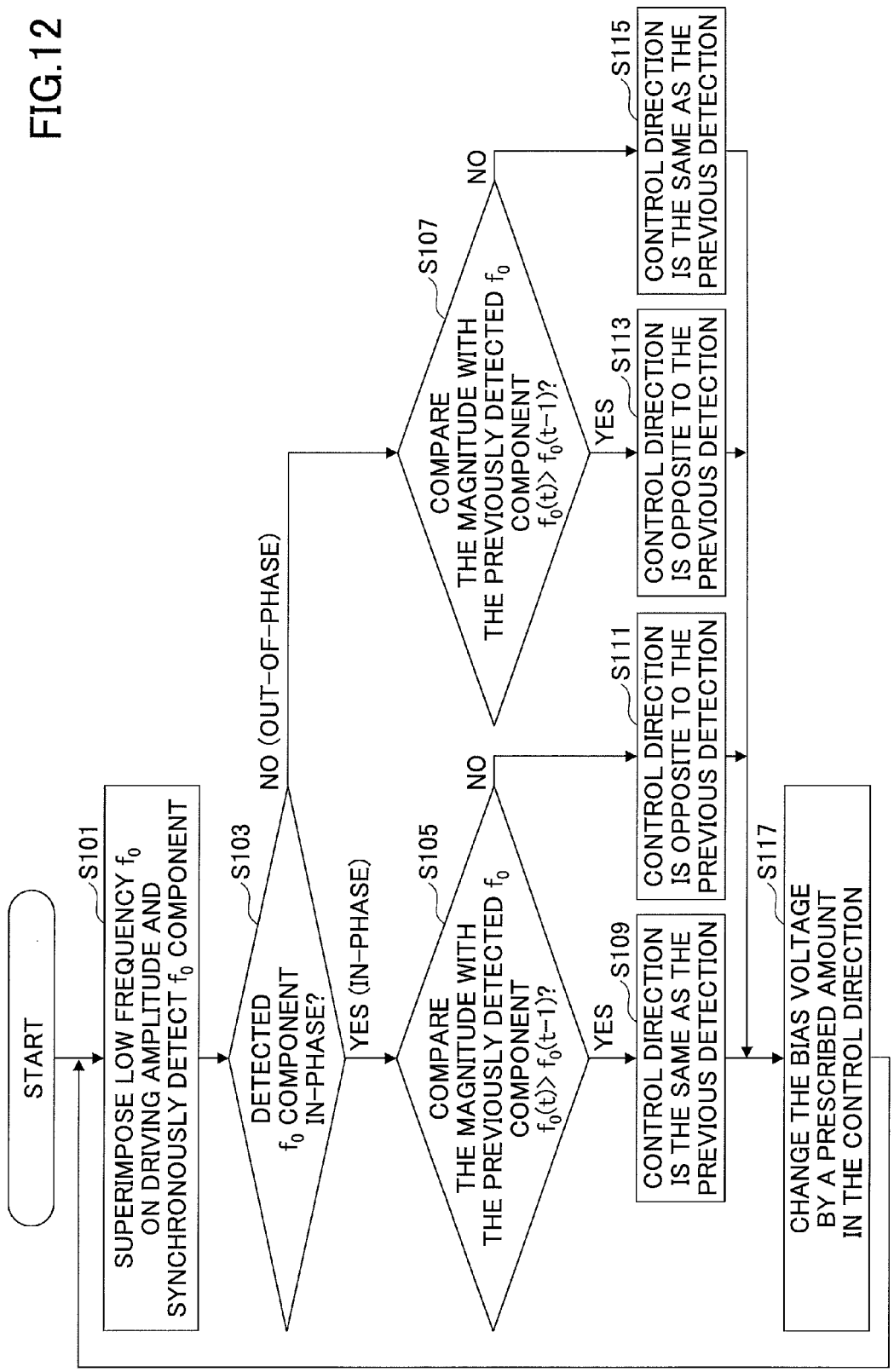
FIG. 12 is a flowchart of bias control according to the embodiment.

FIG. 12 is a flowchart illustrating the operations for controlling the bias voltage applied to the I-arm. The same bias control is performed on the Q-arm. First, a low frequency signal $f_0$ is superimposed on the drive signal to be input to the I-arm Mach-Zehnder interferometer 15I, and a $f_0$ component is detected synchronously with the $f_0$ signal from the electric current signal detected by the photodetector 155 (S101).

Then, it is determined whether the detected $f_0$ component is in-phase with respect to the superimposed $f_0$ signal (S103). If in-phase, it means that the drift of the bias point corresponds to deviation of the bias voltage ranging from 0 to $0.5 \times V\pi$. If 180-degree out-of-phase, it means that the drift of the bias point corresponds to the deviation of the bias voltage ranging from $0.5 \times V\pi$ to $1.0 \times V\pi$. Then, it is further determined in either case whether the currently detected $f_0$ component ($f_0(t)$) is greater than the previously detected $f_0$ component ($f_0(t-1)$) (S105 and S107).

If the detected $f_0$ component is in-phase (YES in S103) and if it is greater than the previously detected $f_0$ component (YES in S105), it means that the bias voltage is approaching the optimum value. In this case, the bias voltage is controlled in the same direction as the previous control (S109). If the detected $f_0$ component is in-phase (YES in S103) and if it is not greater than the previously detected $f_0$ component (NO in S105), it means that the bias voltage is moving away from the optimum level. In this case, the control direction is reversed and the bias voltage is controlled in the direction opposite to the previous control (S111).

If the detected $f_0$ component is 180-degree out-of-phase (NO in S103) and if it is greater than the previously detected $f_0$ component (YES in S107), it means that the bias voltage is moving away from the optimum level. In this case, the control direction is reversed and the bias voltage is controlled in the direction opposite to the previous control (S113). If the detected $f_0$ component is 180-degree out-of-phase (NO in S103) and if it is not greater than the previously detected $f_0$ component (NO in S107), it means that the bias voltage is approaching the optimum level. In this case, the bias voltage is controlled in the same direction as the previous control (S115).

Upon determination of the control direction, the bias voltage is changed by a prescribed amount (S117). The amount of change (step size) in the bias voltage is one obtained by performing predetermined calculation on the detected $f_0$ component. For example, the changing amount may be in proportion to the reciprocal of the magnitude of the detected $f_0$ component. Alternatively, the changing size may be in proportion to the absolute value of the difference between the currently detected f0 component and the previously detected $f_0$ component. As another alternative, a fixed step size may be used to control the bias voltage.

By repeating the operation flow from S101 to S119, the $f_0$ component detected from the monitor signal (i.e., output from the photodetector 155) can be brought to be in-phase and the maximum, thereby controlling the bias voltage to the optimum level.

Figure 13:
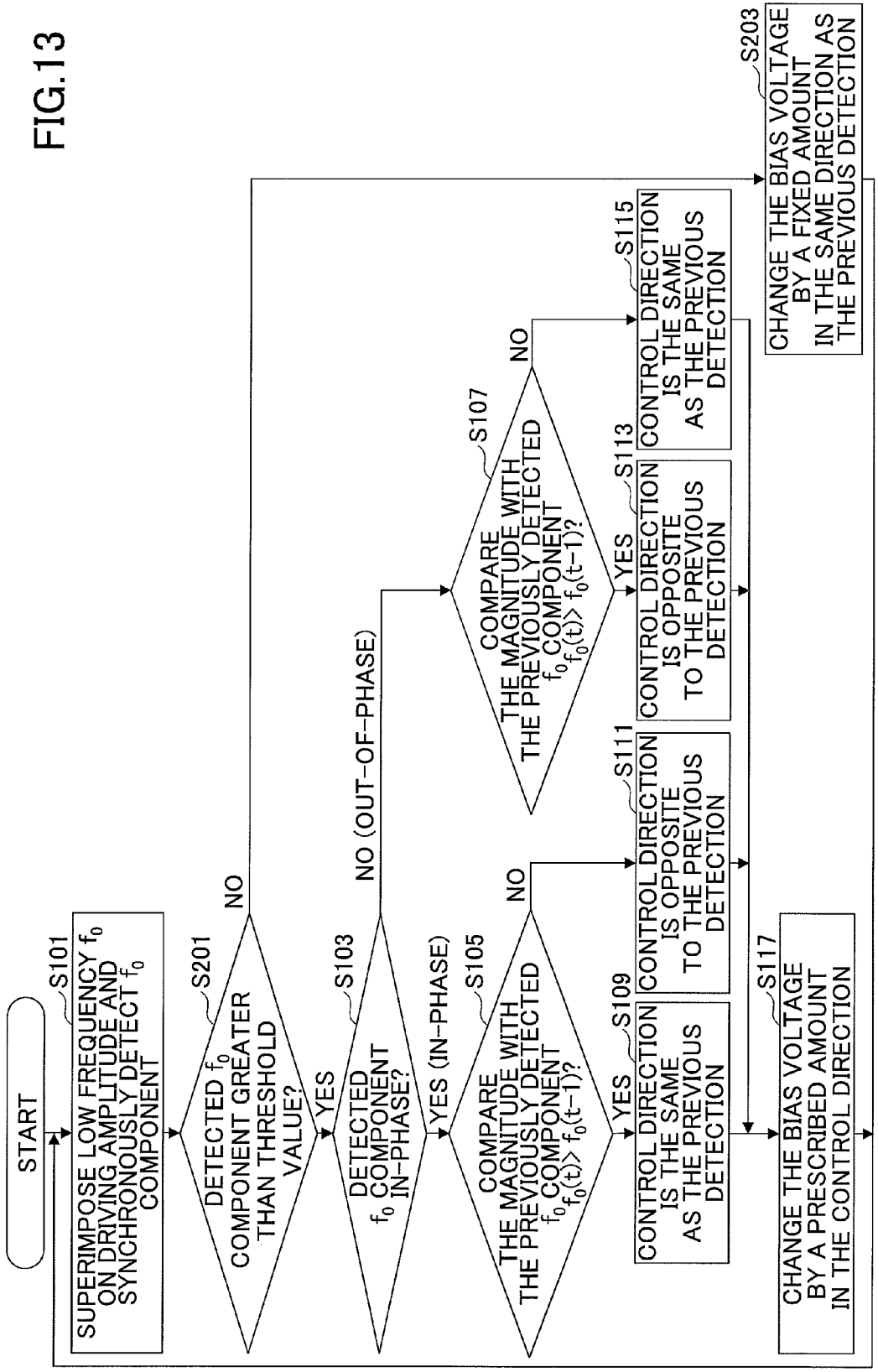
FIG. 13 illustrates a modification of the bias control of FIG. 12.

FIG. 13 illustrates a modification of the bias voltage control flow of FIG. 12. The steps the same as those in FIG. 12 are denoted by the same symbols and the redundant explanation for them is omitted.

There is a noise contained in the monitored light signal detected by the photodetector 155 and output as an electric current signal. For this reason, synchronous detection may not be performed accurately when the magnitude of the detected $f_0$ component is small (with the deviation of the bias voltage near $0.5 \times V\pi$). To obviate this inconvenience, bias control is performed in FIG. 13 taking into account the case in which the magnitude of the detected $f_0$ component is small.

A low frequency signal $f_0$ is superimposed on the amplitude of the drive signal of the optical modulator 15 and $f_0$ component is detected from the output signal of the optical modulator 15 (S101). Then, it is determined whether the detected $f_0$ component is greater than the threshold (S201). When the detected $f_0$ component is greater than the threshold (YES in S201), steps S103 through S117 are implemented as in FIG. 12. If the detected $f_0$ component is at or below the threshold (NO in S201), the bias voltage is changed in the same control direction as the previous detection by a fixed step size (S203). This arrangement can prevent the bias control from being disabled when the deviation of the bias voltage is near 0.5×Vπ.

Figure 14:
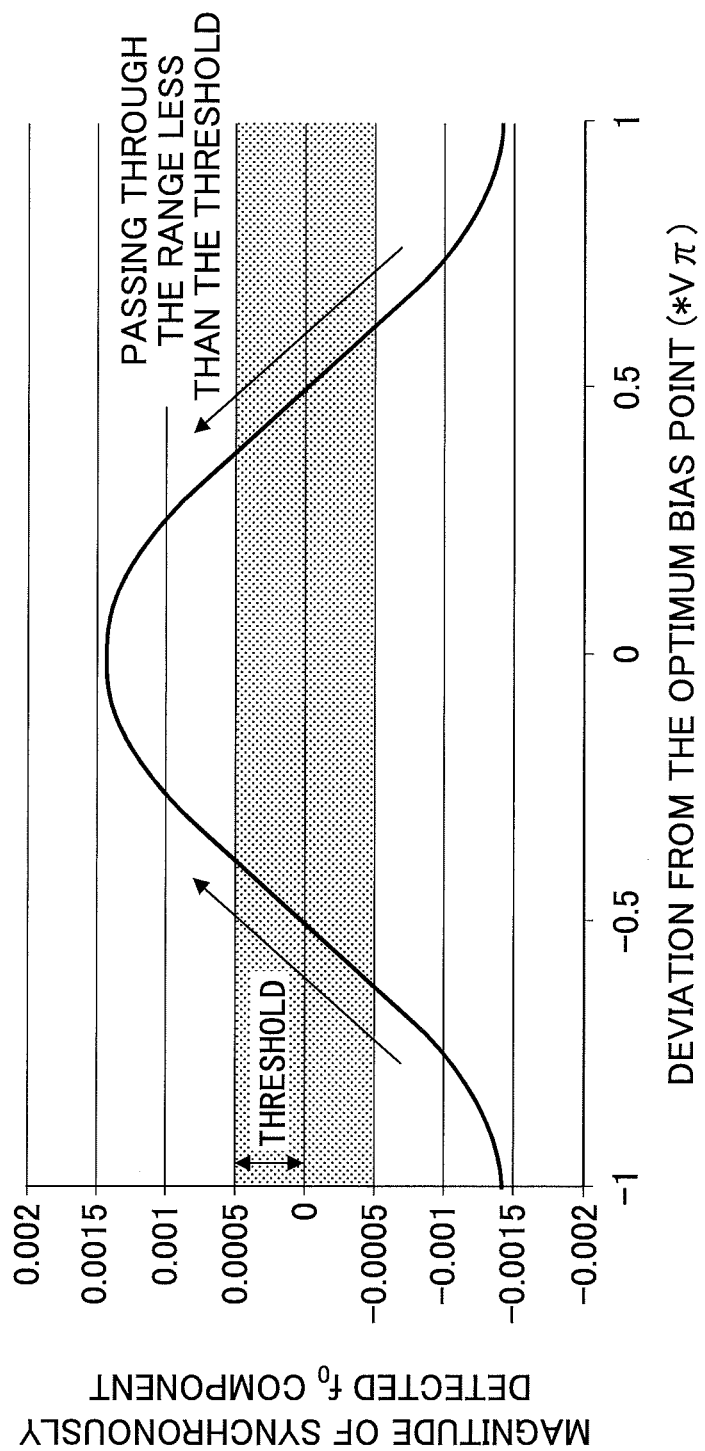
FIG. 14 is a diagram to explain the operation of step S203 of FIG. 13.

FIG. 14 is a diagram to explain the step S203 of FIG. 13 in more detail. The control scheme of the embodiment can bring the bias voltage to the optimum level by controlling such that the low frequency ($f_0$) component contained in the output of the optical modulator 15 becomes the maxim and in-phase with the superimposed low frequency signal regardless of the amplitude of the drive signal. However, in the range with the deviation of the bias voltage of ±0.5×Vπ, the magnitude of the detected $f_0$ component approaches zero and the $f_0$ component may be buried in the noise. To avoid this inconvenience, a threshold is set and fixed-size control is performed in the same direction as the previous detection when the magnitude (or the absolute value) of the synchronously detected $f_0$ component is at or below the threshold.

As illustrated in FIG. 14, regardless of the bias voltage deviating direction (positive or negative) from the optimum point, the bias voltage is always controlled so as to bring the $f_0$ component to the maximum. The synchronously detected $f_0$ level entering in the darkened zone of FIG. 14 means that the bias voltage control has been made toward the optimum bias condition till then. Accordingly, when the magnitude (or the absolute values) of the detected $f_0$ component has become equal to or less than the threshold, the control operation is continued in the same direction to keep on well-regulated bias control.

<Application to Narrowband Modulation or Higher-Level Modulation>

Figure 15:
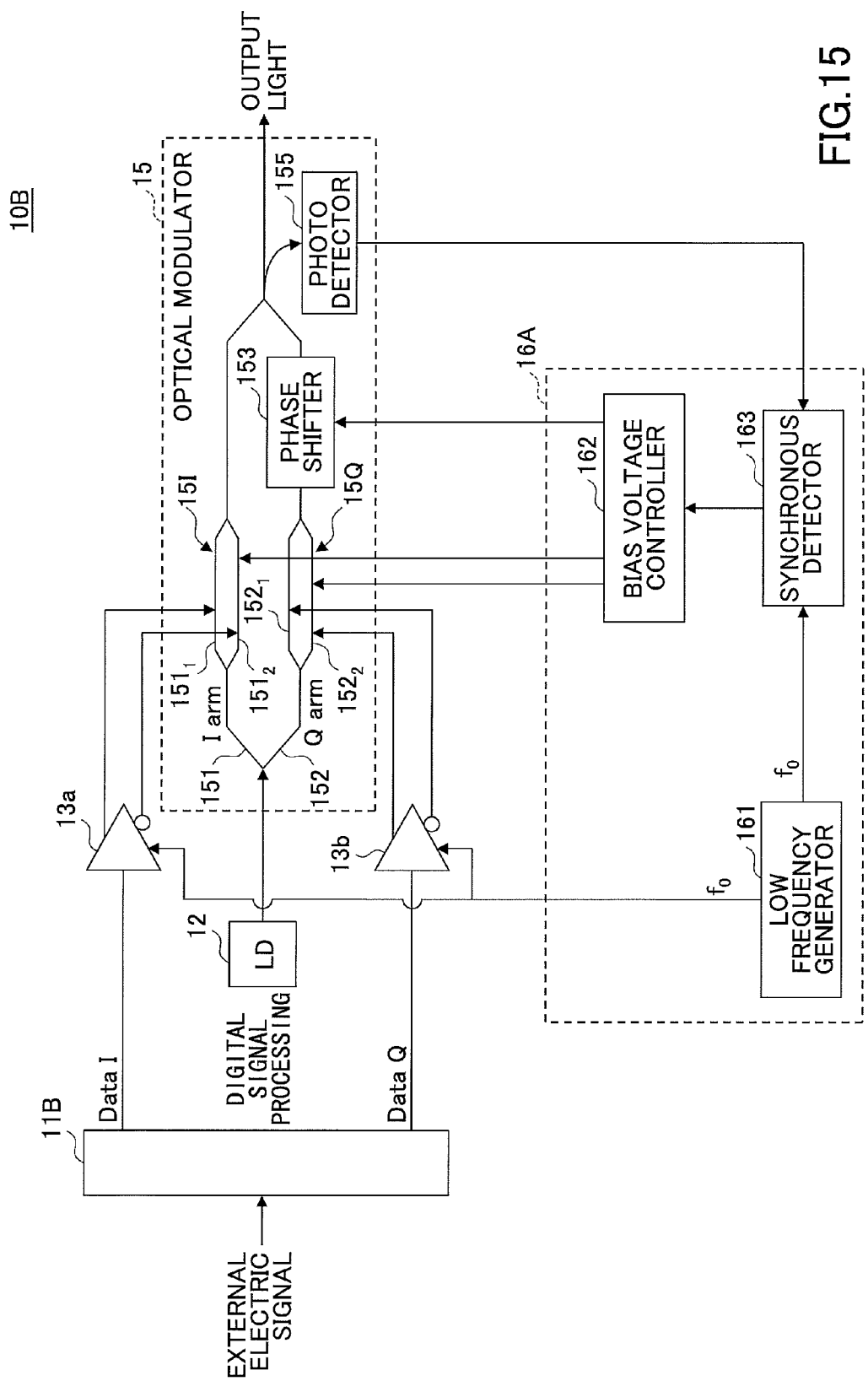
FIG. 15 is a schematic diagram of an optical transmitter applied to Nyquit-QPSK or 16-QAM.

FIG. 15 illustrates an exemplified structure of an optical transmitter 10B, where the optical transceiver 1 is applied to Nyquist-QPSK or 16-QAM. The elements the same as those in FIG. 7 are denoted by the same symbols and redundant explanation is omitted. In the example of FIG. 15, Nyquist-QPSK modulation is performed using a large scale integrated circuit for digital signal processing (DSP-LSI) 11B. The DSP-LSI 11B performs Nyquist filtering on the electric signal to be transmitted in the digital signal processing. By means of the Nyquist filtering, the frequency spectrum is narrowed and the spectrum use efficiency is improved. For the narrowband QPSK signal, the peak-to-peak driving amplitude becomes greater than the average driving amplitude. For the purpose of providing electrical-to-optical conversion to peak points of the sinusoidal signal, the average driving amplitude is generally reduced to or near 1×Vπ (see diagram (B) of FIG. 1). With the structure and the method of the embodiment, $f_0$ components can be detected from the output of the optical modulator even if the driving amplitude is 1×Vπ. Consequently, bias voltage can be appropriately controlled according to the control flow of FIG. 12 or FIG. 13.

Similarly, for 16-QAM, the DSP-LSI 11B generates an 16-QAM electrical waveform. During the bias control, the bias voltage is controlled such that the detected $f_0$ component becomes the maximum as in Nyquist-QPSK.

Figure 16:
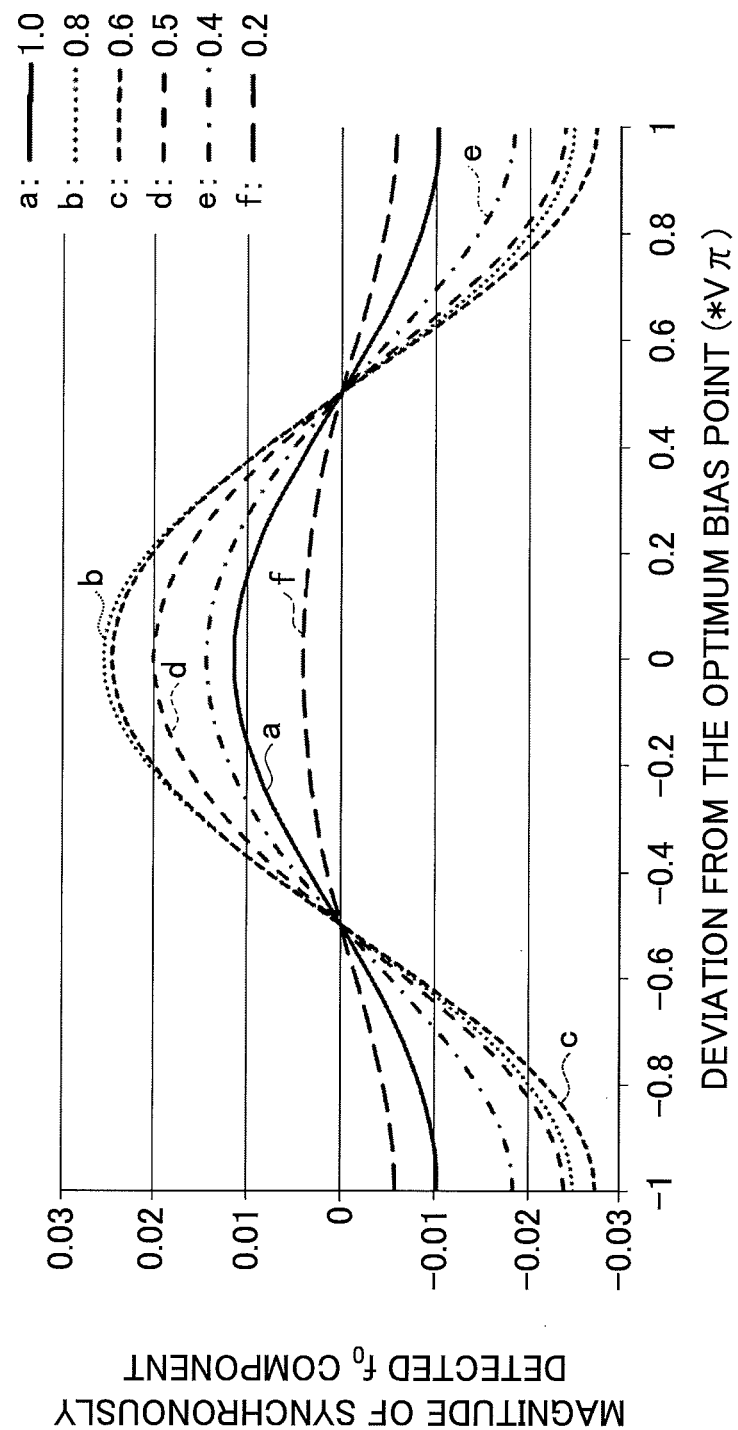
FIG. 16 is a chart illustrating a relation between the deviation from the maximum bias point and magnitude of the synchronously detected $f_0$ component when applied to 16-QAM.

FIG. 16 is a chart illustrating the simulation result plotting the relation between the deviation of the bias point from the optimum point and magnitude of the detected low frequency component for various values of the driving amplitude. As in the chart of FIG. 11 for QPSK waveforms, the $f_0$ component becomes the maximum at the optimum bias point. Accordingly, bias control can be performed according to the control flow of FIG. 12 or FIG. 13. In higher-level modulation such as 64-QAM or 128-QAM, the relation between the drift of the bias point and the magnitude of the detected $f_0$ component equally applies, and bias control can be performed in the same as in 16-QAM.

Figure 17:
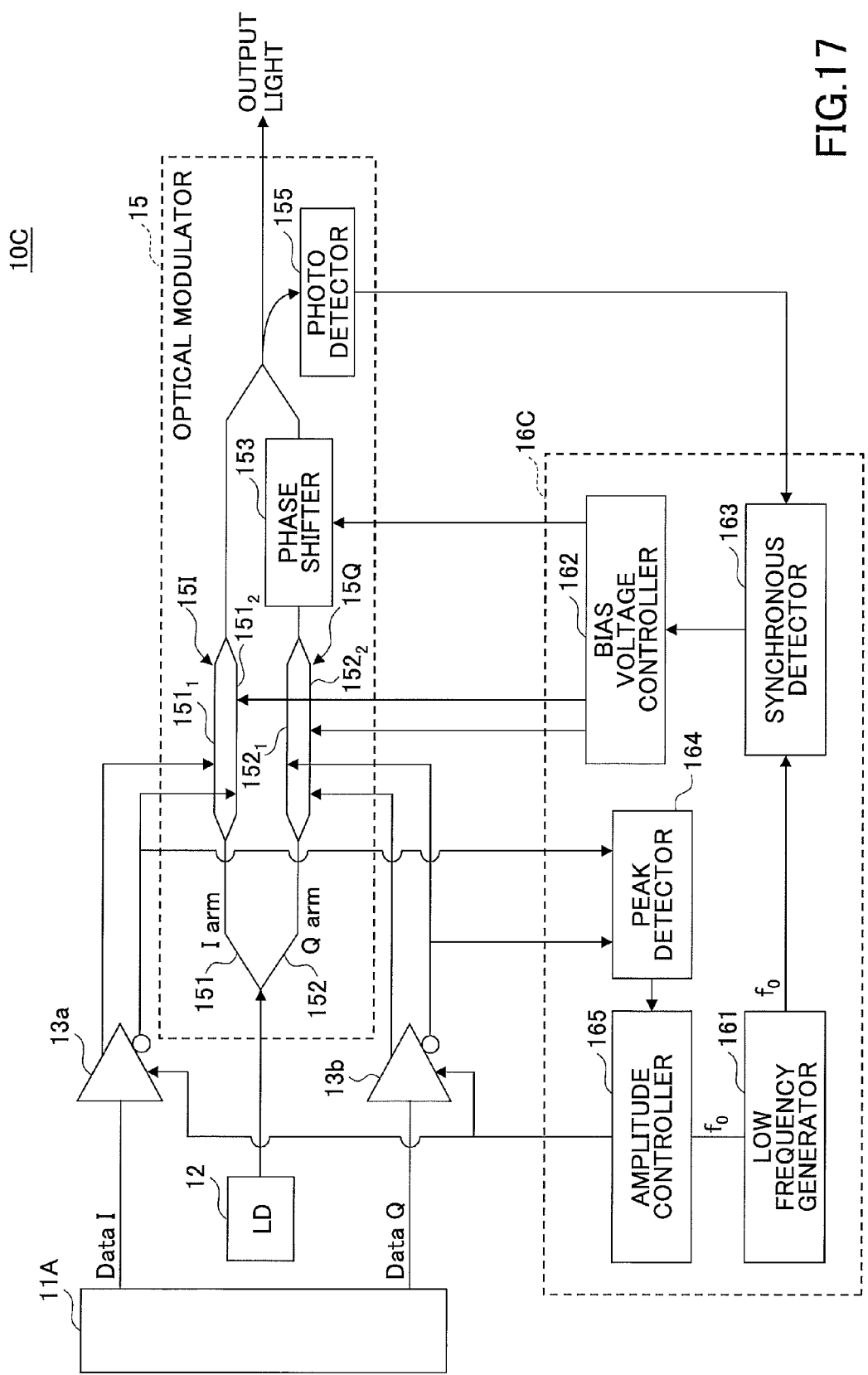
FIG. 17 is a schematic diagram of an optical transmitter as another modification.

FIG. 17 is a schematic diagram of an optical transmitter 10C, which is another modification of the optical transmitter used in the optical transceiver 1. The above-described structure and method can achieve uniform control on the bias voltage regardless of the driving amplitude, by bringing the synchronously detected $f_0$ component to be the maxim and to be in-phase with the superimposed $f_0$ signal. However, the $f_0$ component detection sensitivity varies depending on the driving amplitude (see FIG. 11). To compensate for the difference in detection sensitivity, at least one of the driving amplitude and the magnitude of the low frequency signal $f_0$ to be superimposed are adjusted in FIG. 17.

The optical transmitter 10C has a controller 16C. The controller 16C has a peak detector (or amplitude detector) 164 and an amplitude controller 165, in addition to a low frequency generator 161, a bias voltage controller 162 and a synchronous detector 163. The peak detector 164 detects a peak level of the drive signal output from each of the modulator drivers 13a and 13b, and supplies the detection result to the amplitude controller 165. Based upon the peak level of the drive signal, the amplitude controller 165 adjusts the magnitude of the low frequency signal $f_0$ to be superimposed such that the detection sensitivity for the synchronously detected $f_0$ component becomes constant. The structures and the functions of the low frequency generator 161, the bias voltage controller 162 and the synchronous detector 163 are the same as those already explained with reference to FIG. 7, and redundant explanation is omitted.

In QPSK waveforms, when the driving amplitude is 2×Vπ (1.0×2Vπ), the detection sensitivity for the synchronously detected $f_0$ component becomes zero (see FIG. 11). In this case, the driving amplitude is adjusted so as to be smaller than 2×Vπ. Under this adjustment, the $f_0$ component contained in the output of the optical modulator 15 can be synchronously detected, and bias control can be performed continuously. The peak detector 164 detects the peak level of the driving amplitude and supplies the detection result to the amplitude controller 165. When the detected driving amplitude is 2×Vπ, the amplitude controller 165 adjusts the driving amplitude so as to slightly reduces the peak level.

<Application to Semiconductor Optical Modulator>

Figure 18:
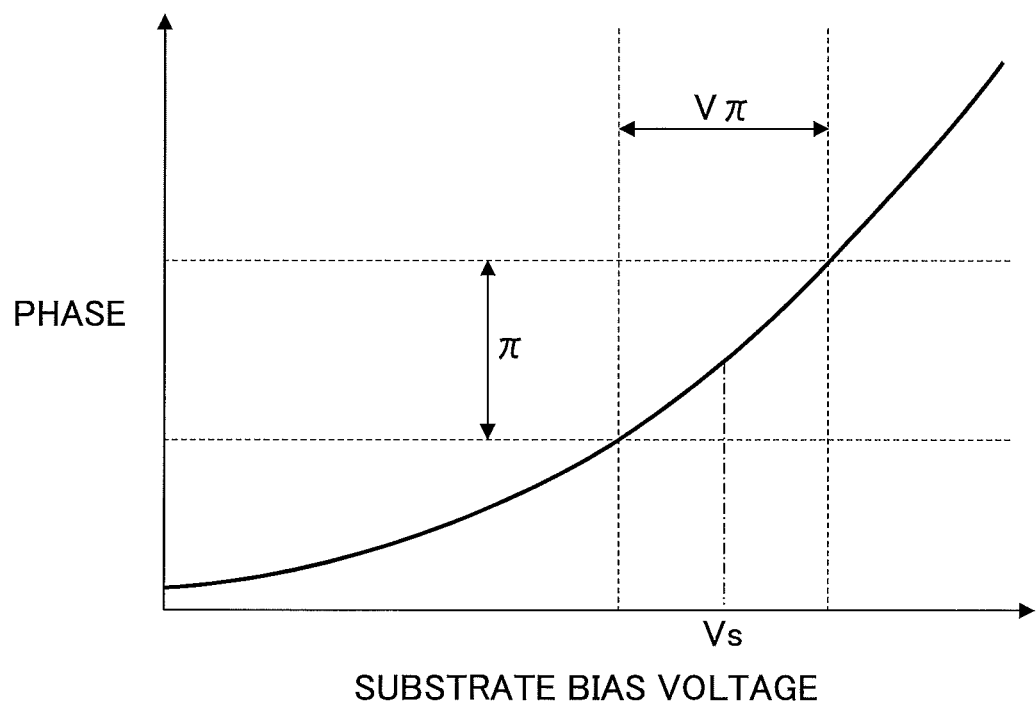
FIG. 18 is a diagram to explain the relation between substrate bias voltage and optical phase in a semiconductor optical modulator.

FIG. 18 is a chart illustrating the relation between the substrate bias voltage and optical phase. In a semiconductor optical modulator, control for "substrate bias" is employed other than the bias control for correcting the drift of the operating point (or the optical output characteristic with respect to the drive signal) due to temperature change or change with time. As the substrate bias voltage increases, the slope of the phase rotation increases. This phenomenon corresponds to the fact that the half-wave voltage Vπ of the optical modulator decreases. The optimum point of the substrate bias voltage is the center of the half-wave voltage Vπ required to produce a phase shift of π radians.

Figure 19:
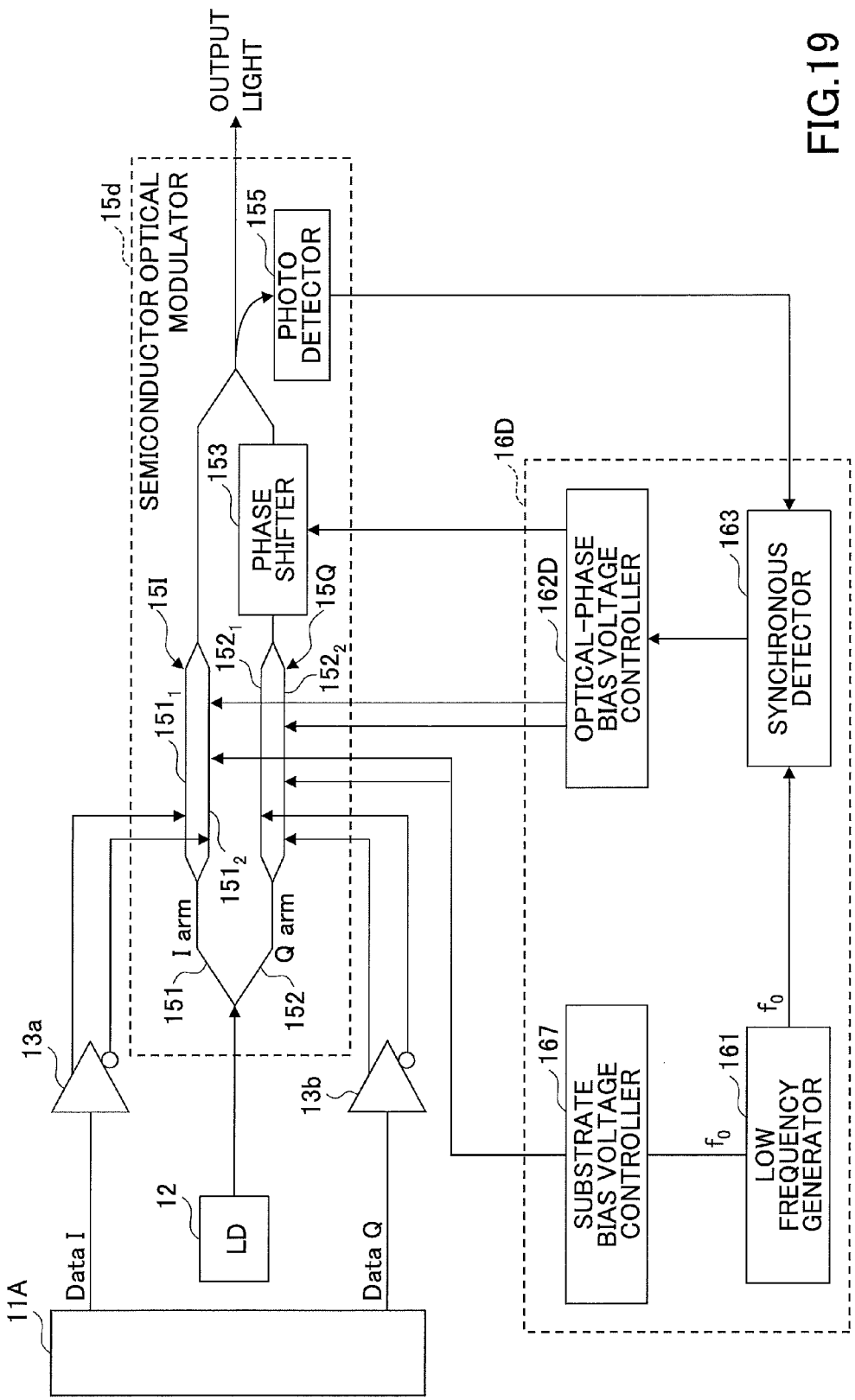
FIG. 19 is a schematic diagram of a QPSK optical transmitter using a semiconductor optical modulator.

FIG. 19 is a schematic diagram of a QPSK optical transmitter 10D that uses a semiconductor optical modulator 15d as the optical modulator 15. Unlike a Lithium niobate (LN) Mach-Zehnder modulator for conducting phase modulation making use of a change in the index of refraction (the Pockels effect) of a $LiNbO_3$ crystal, a semiconductor optical modulator conducts phase modulation making use of a phase change due to absorption of light. A portion of the output of the semiconductor optical modulator 15d is monitored by the photodetector 155. A monitor signal (electric current signal) is fed back to a controller 16D.

The controller 16D has a low frequency generator 161, a synchronous detector 163, an optical-phase bias voltage controller 162D and a substrate bias voltage controller 167. The optical-phase bias controller 162D has the same structure and the same function as those of the bias voltage controller 162 illustrated in FIG. 7, FIG. 15, and FIG. 17. For the purpose of distinguishing between "substrate bias control" and "bias control", the bias voltage controller 162 is named an "optical-phase bias voltage controller 162D" in FIG. 19.

The low frequency generator 161 generates a low frequency signal $f_0$ and superimposes the $f_0$ signal on the substrate bias voltage generated by the substrate bias voltage controller 167. In place of superimposing the $f_0$ signal on the drive signals generated by the modulator drivers 13a and 13b, a low frequency signal $f_0$ is superimposed on the substrate bias voltage applied to the I-arm 15I and the Q-arm 15Q. Superimposing the $f_0$ signal on the driving amplitude is the same thing as superimposing the $f_0$ signal on the substrate bias voltage, from the viewpoint of changing the ratio of the amplitude of the drive signal with respect to the half-wave voltage $V\pi$. When the substrate bias voltage swings toward the high-voltage side, the half-wave voltage $V\pi$ becomes smaller (see FIG. 18). At this time, the driving amplitude with respect to the half-wave voltage $V\pi$ of the modulator changes in the increasing direction. This is the same as the case in which the low frequency ($f_0$) signal is superimposed on the drive signal and driving amplitude swings in the increasing direction. By providing gentle amplitude modulation to the substrate bias voltage using the low frequency signal, the driving amplitude with respect to the half-wave voltage $V\pi$ of the optical modulator 15 becomes one illustrated in FIG. 7B. This leads to the fact that the relation between the deviation of the phase-bias voltage from the optimum point and the magnitude of the $f_0$ component detected by the synchronous detector 163 becomes one illustrated in FIG. 11. Accordingly, the bias voltage (i.e., the optical-phase bias voltage) is controlled such that the $f_0$ component detected by the synchronous detector 163 becomes in-phase and the maximum under the control flow of FIG. 12 or FIG. 13. Concerning the control on the substrate bias voltage, any known technique may be used.

The structure of FIG. 17 may be applied to the semiconductor optical modulator of FIG. 19. The peak level of the amplitude of the drive signal may be detected and the driving amplitude may be adjusted so as not to be double the half-wave voltage ($2 \times V\pi$). The amplitude of the drive signal may be controlled so as to be within the range less than ($2 \times V\pi$).

In place of using the light source 12 for transmitter and the local oscillator light source 22 separately in the optical transceiver 1 of FIG. 6, a single light source may be used. The light beam from the single light source may be branched into two portions for transmission light and local oscillator light.

According to the embodiments, the bias voltage (i.e., the optical-phase bias voltage) of an optical modulator can be controlled to the optimum point in a stable manner, regardless of the driving amplitude of the optical modulator.

What is claimed is:

1. An optical transmitter comprising:
   an optical modulator having Mach-Zehnder interferometers;
   modulator drivers configured to drive the optical modulator;
   a low frequency generator configured to generate a low frequency signal that changes a ratio of a driving amplitude over a half-wave voltage of the optical modulator;
   a photodetector configured to detect a portion of output light of the optical modulator;
   a detector configured to detect a low frequency component contained in a detected signal from the photodetector using the low frequency signal; and
   a bias voltage controller configured to control a bias voltage for the optical modulator such that the detected low frequency component becomes the maximum and in-phase with the low frequency signal;
   an amplitude detector configured to detect an amplitude level of output signals from the modulator drivers; and
   an amplitude controller configured to control a magnitude of the low frequency signal to be superimposed on a drive signal for driving the optical modulator based upon a detection result of the amplitude detector.

2. The optical transmitter according to claim 1, wherein the optical modulator is driven by the drive signal in which peak edges of a driving waveform change at a frequency of the low frequency signal in an amplitude direction symmetrically with respect to a center of the amplitude of the drive signal.

3. The optical transmitter according to claim 1, wherein the Mach-Zehnder interferometers are semiconductor optical modulators of a Mach-Zehnder type, and
   wherein the low frequency signal is superimposed on a substrate bias voltage applied to the semiconductor optical modulators, thereby changing the ratio of the driving amplitude over the half-wave voltage symmetrically with respect to a center of the driving amplitude.

4. The optical transmitter according to claim 1, wherein the amplitude controller controls an amplitude of the drive signal generated by the modular drivers so as to be constant based upon the detection result of the amplitude detector.

5. The optical transmitter according to claim 2, wherein the amplitude controller controls the amplitude of the drive signal generated by the modular drivers so as to be constant based upon the detection result of the amplitude detector.

6. The optical transmitter according to claim 3, wherein the amplitude controller controls the amplitude of the drive signal generated by the modular drivers so as to be constant based upon a detection result of the amplitude detector.

7. The optical transmitter according to claim 1, further comprising:
   a signal processor configured to generate an electric signal to be supplied to the modulator drivers,
   wherein the electric signal is a narrowband signal having undergone Nyquist filtering or a multi-level signal produced by digital signal processing.

8. An optical transceiver comprising:
   the optical transmitter according to claim 1; and
   a frontend receiver configured to externally receive an optical signal and process the optical signal.

9. A bias control method for an optical modulator, comprising:
   when driving an optical modulator having Mach-Zehnder interferometers, supplying a low frequency signal for changing a ratio of a driving amplitude over a half-wave voltage of the optical modulator;

detecting a low frequency component contained in an output of the optical modulator using the low frequency signal; and controlling a bias voltage for the optical modulator such that the low frequency component becomes the maximum and in-phase with the low frequency signal;

detecting an amplitude level of output signals from the modulator drivers; and controlling a magnitude of the low frequency signal to be superimposed on a drive signal for driving the optical modulator based upon a detection result of the amplitude level of the output signals from the modulator drivers.

* * * * *